April 4, 1950 R. F. WHEELER 2,503,182
LINE-PRINTING TYPEWRITER
Filed Aug. 30, 1948 14 Sheets-Sheet 1

INVENTOR.
Robert F. Wheeler
BY
*David Manly Heller*
Attorney

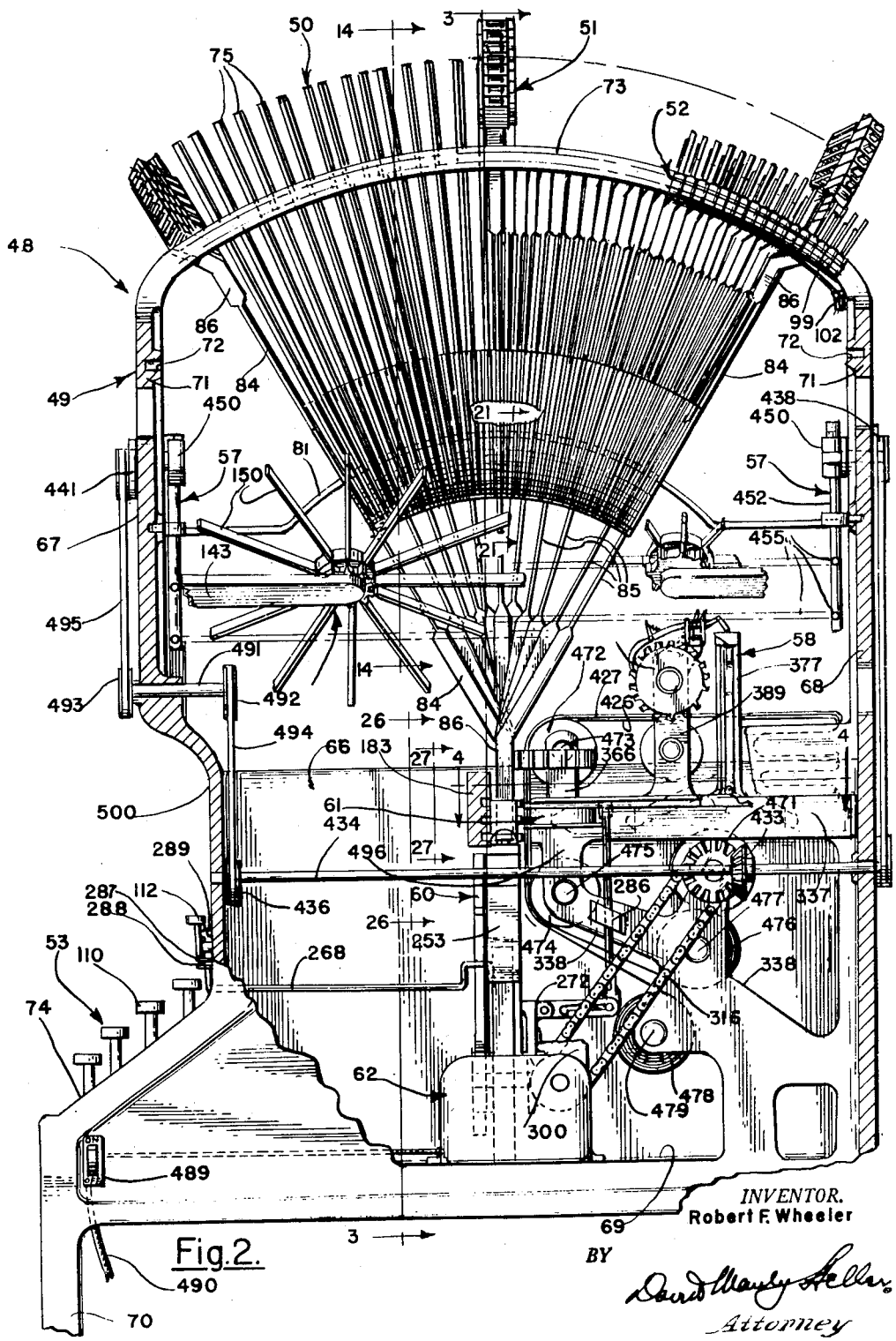

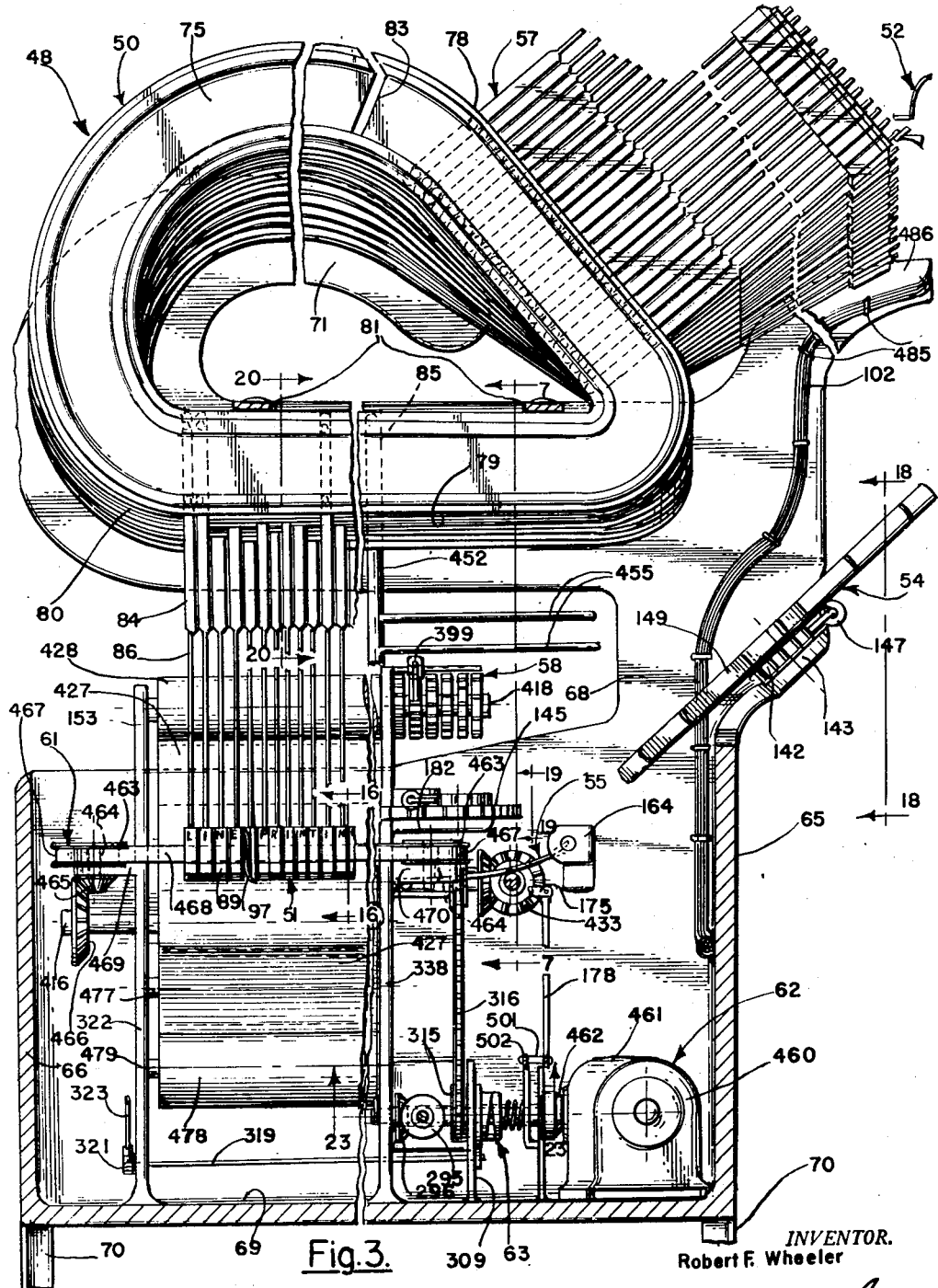

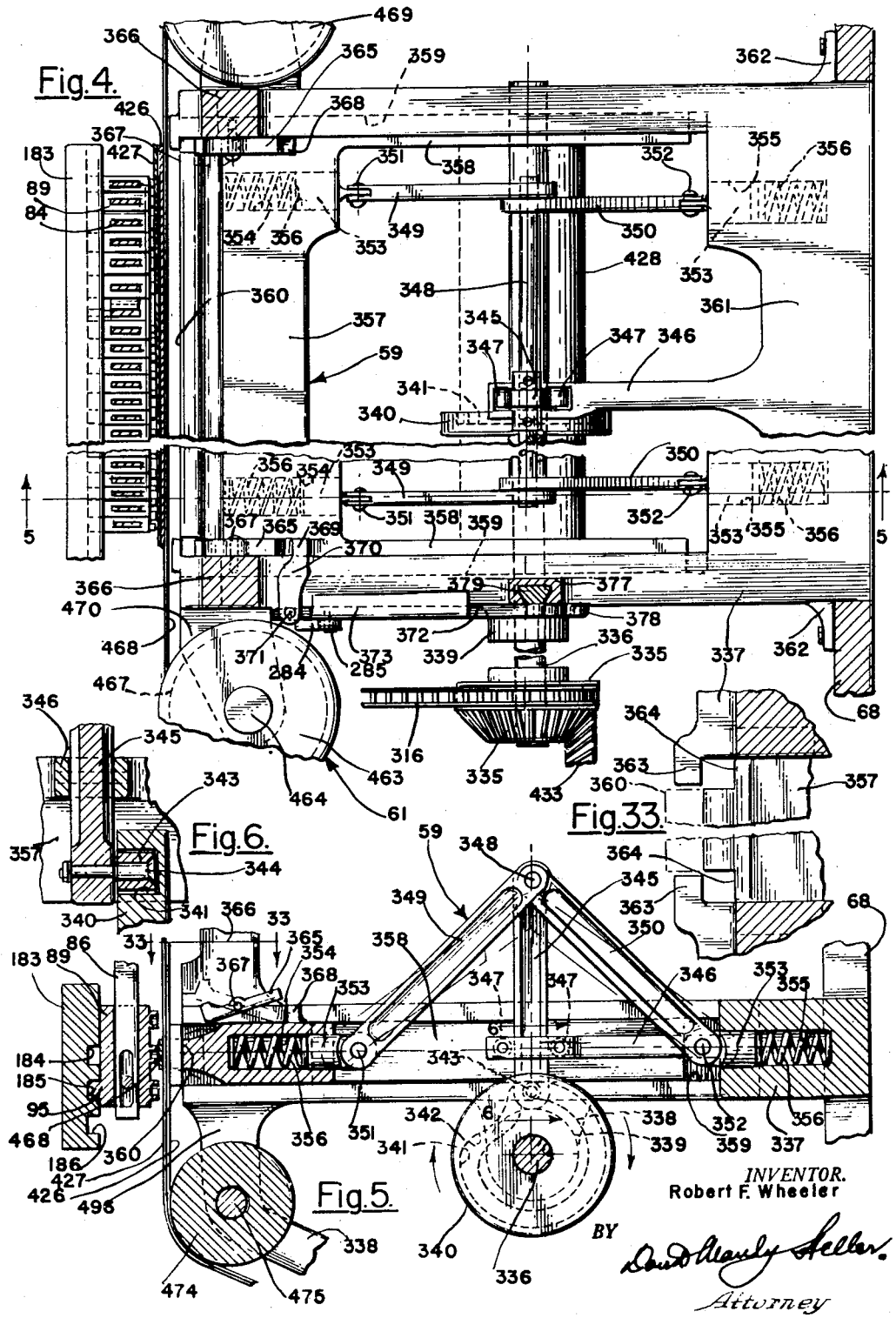

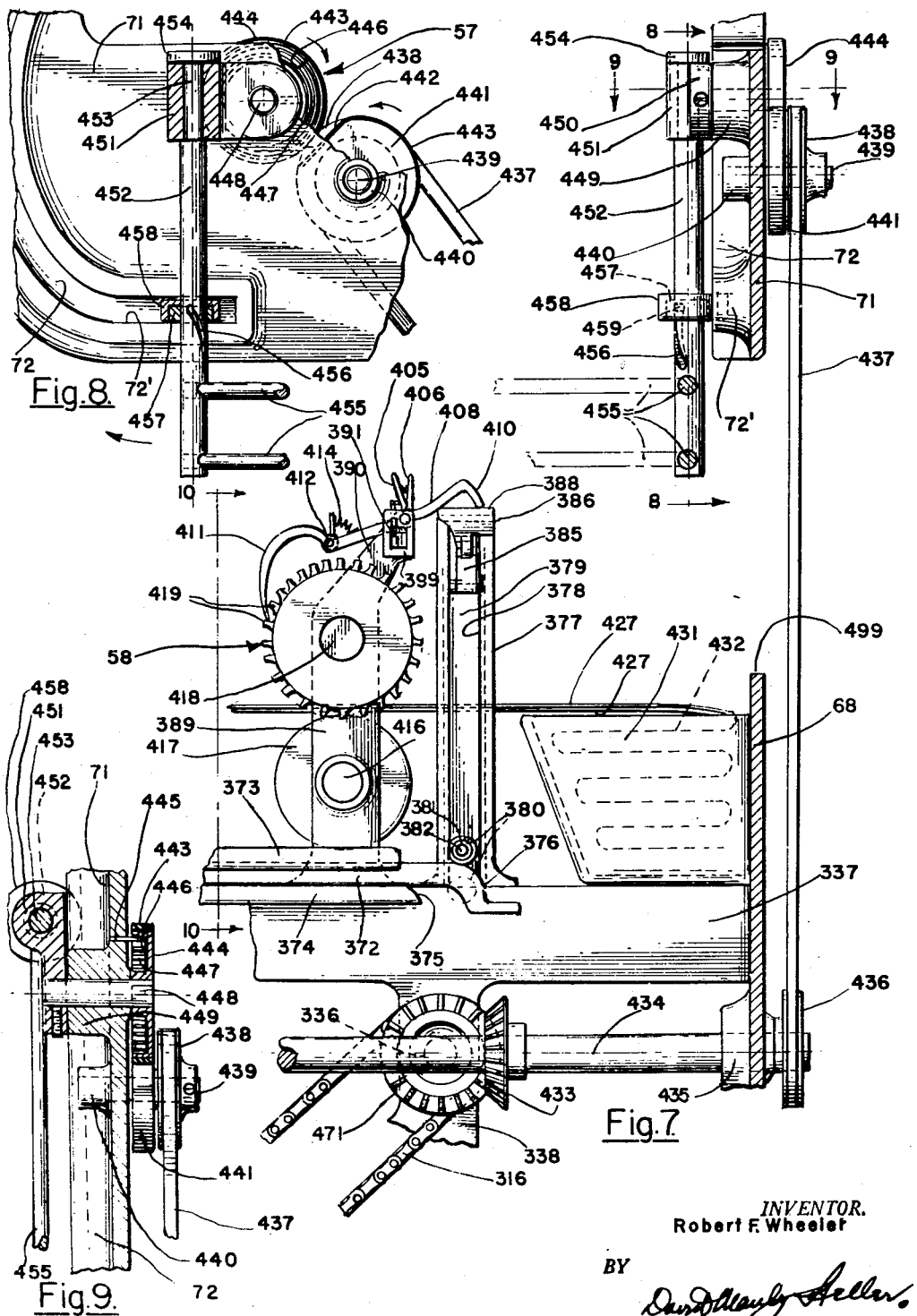

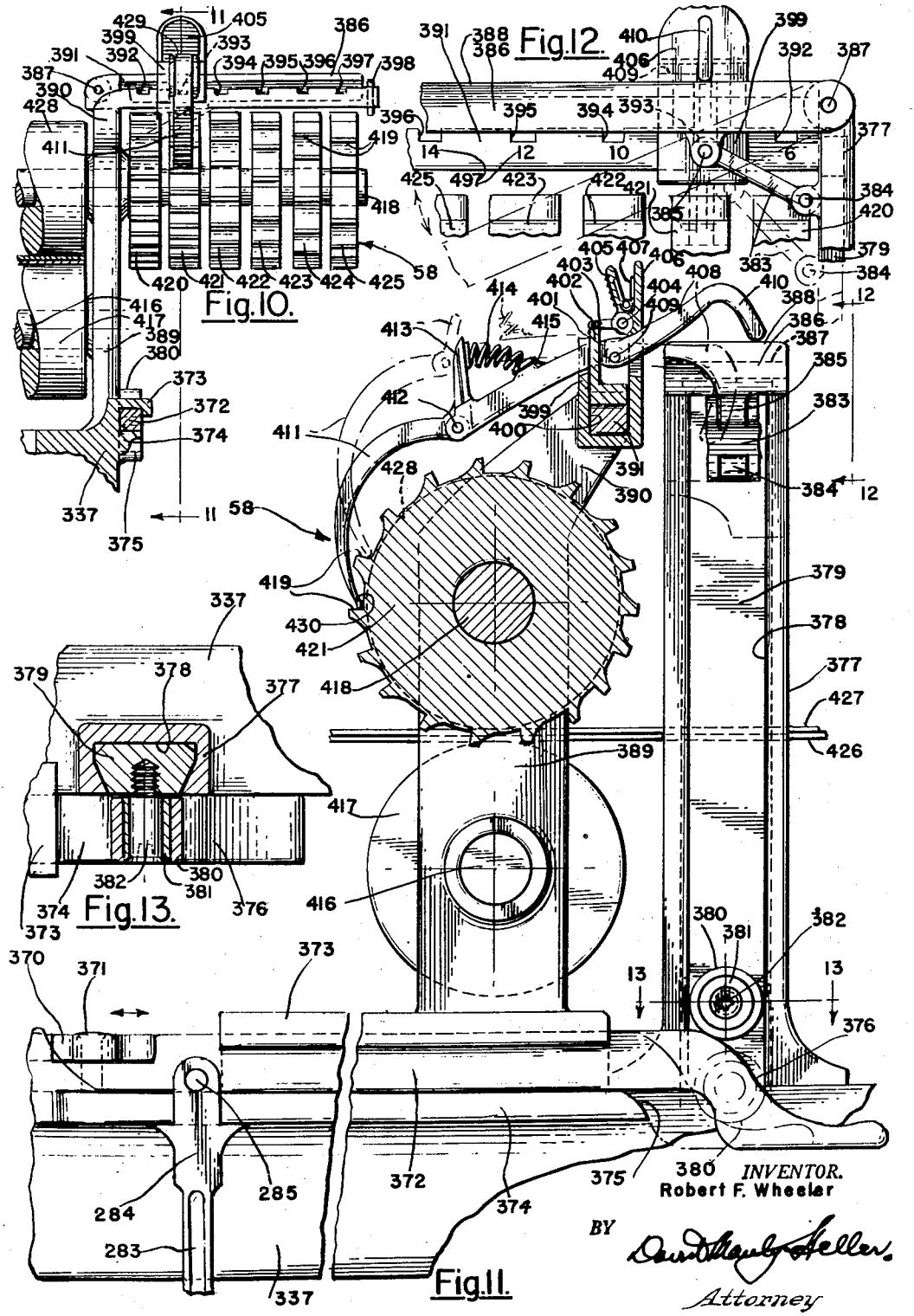

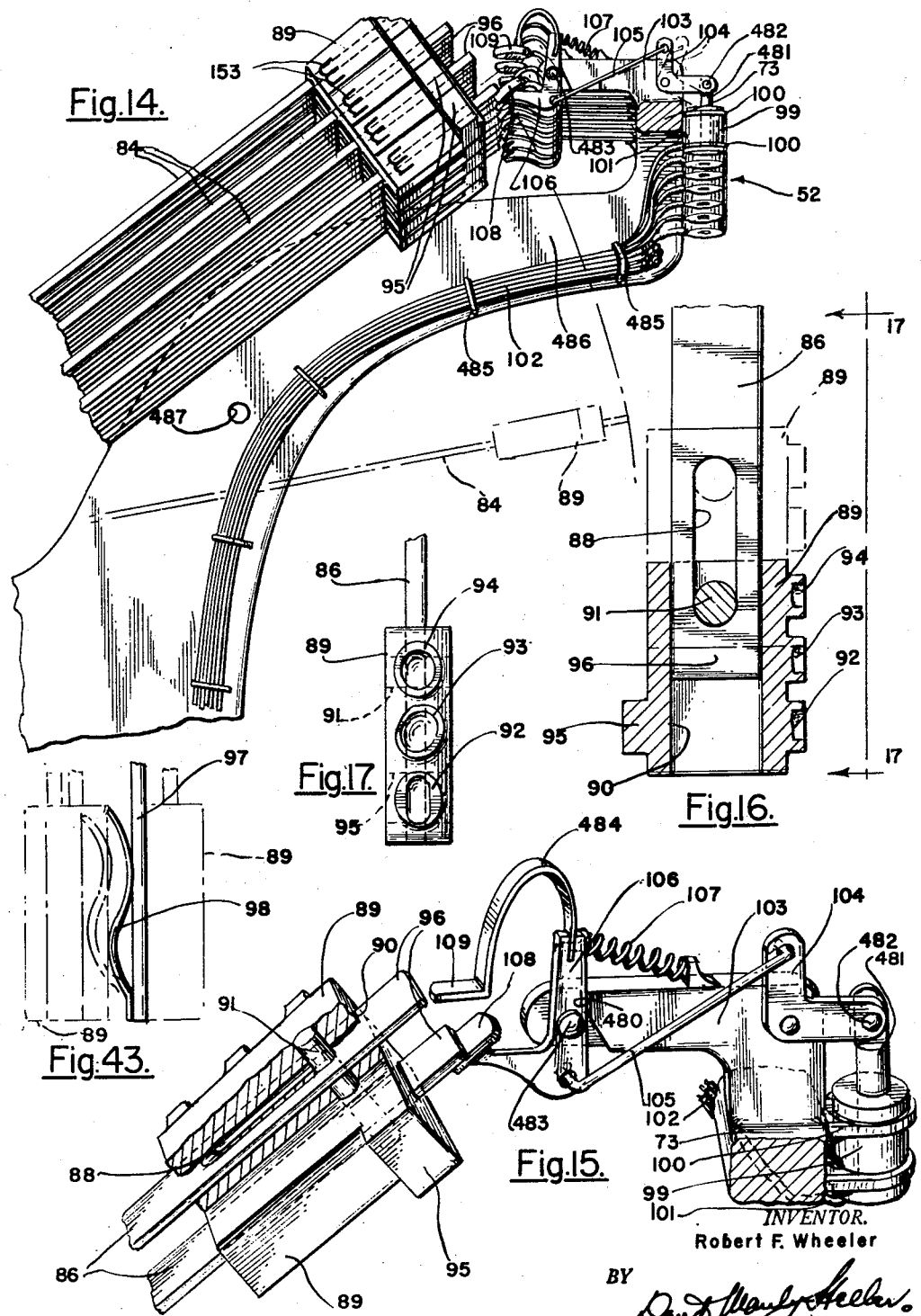

April 4, 1950 R. F. WHEELER 2,503,182
LINE-PRINTING TYPEWRITER
Filed Aug. 30, 1948 14 Sheets-Sheet 8
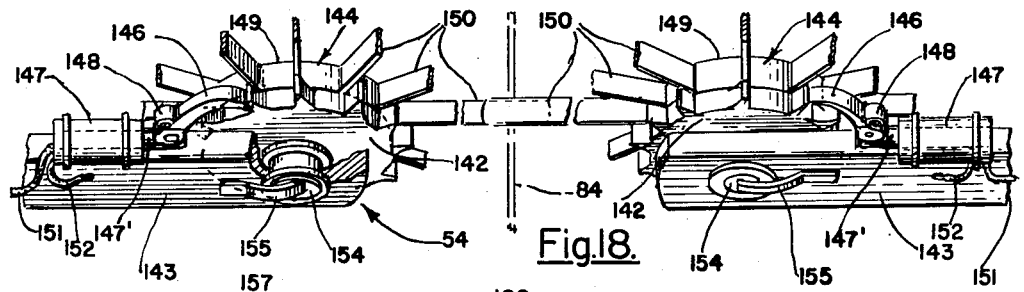
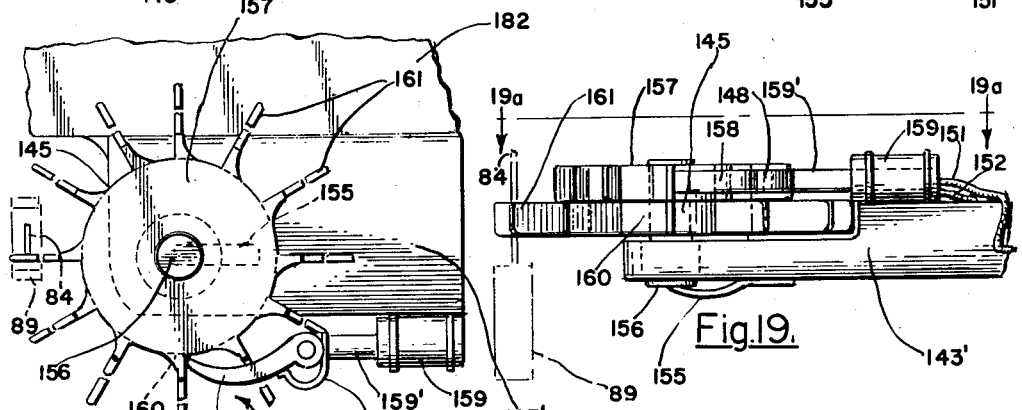
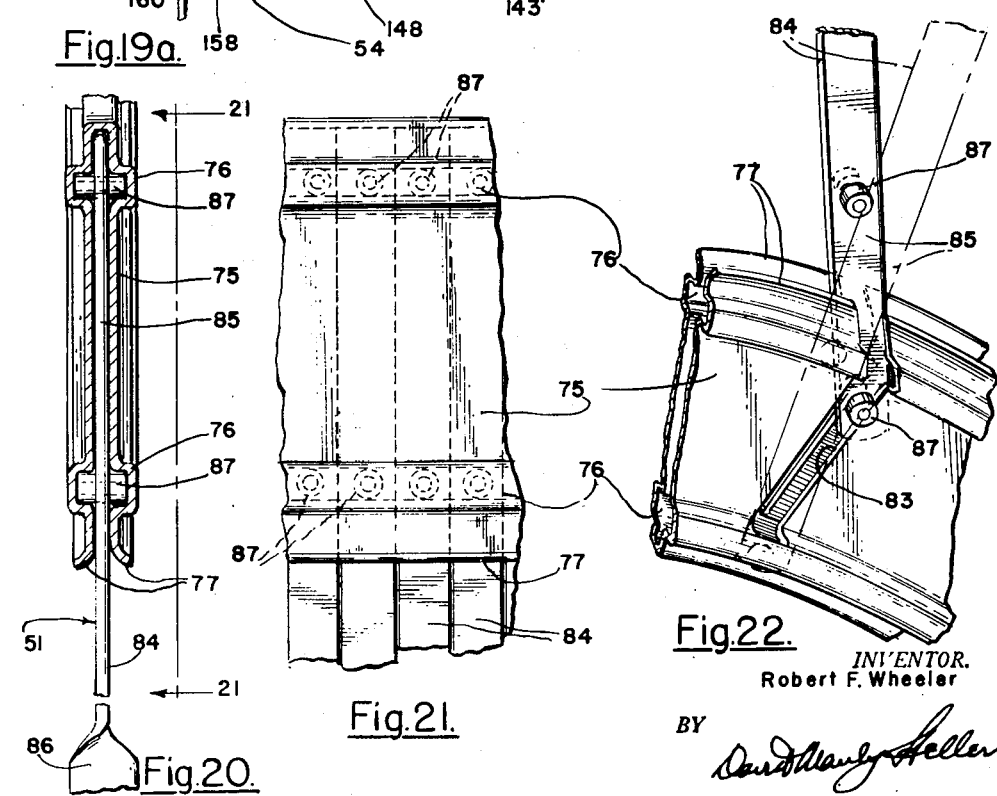
INVENTOR.
Robert F. Wheeler
BY
Attorney April 4, 1950        R. F. WHEELER        2,503,182
LINE-PRINTING TYPEWRITER
Filed Aug. 30, 1948        14 Sheets-Sheet 9
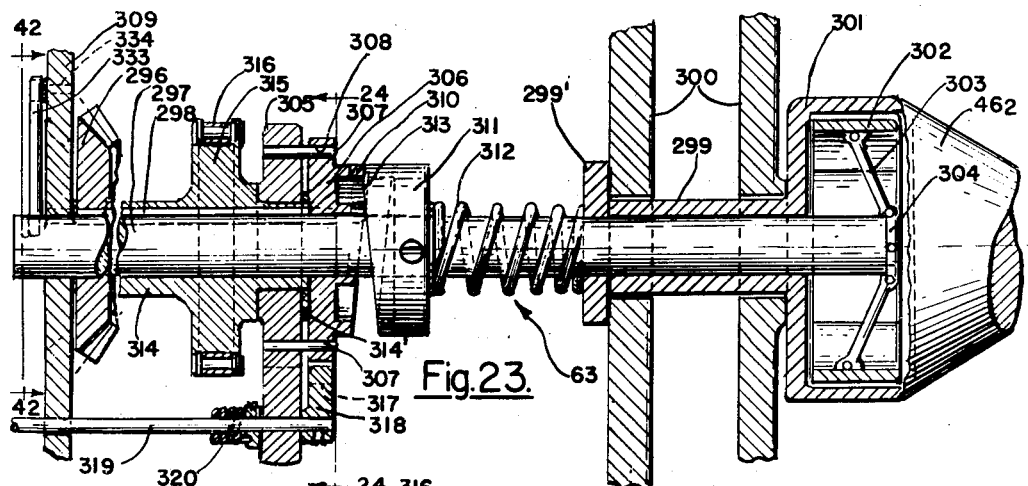
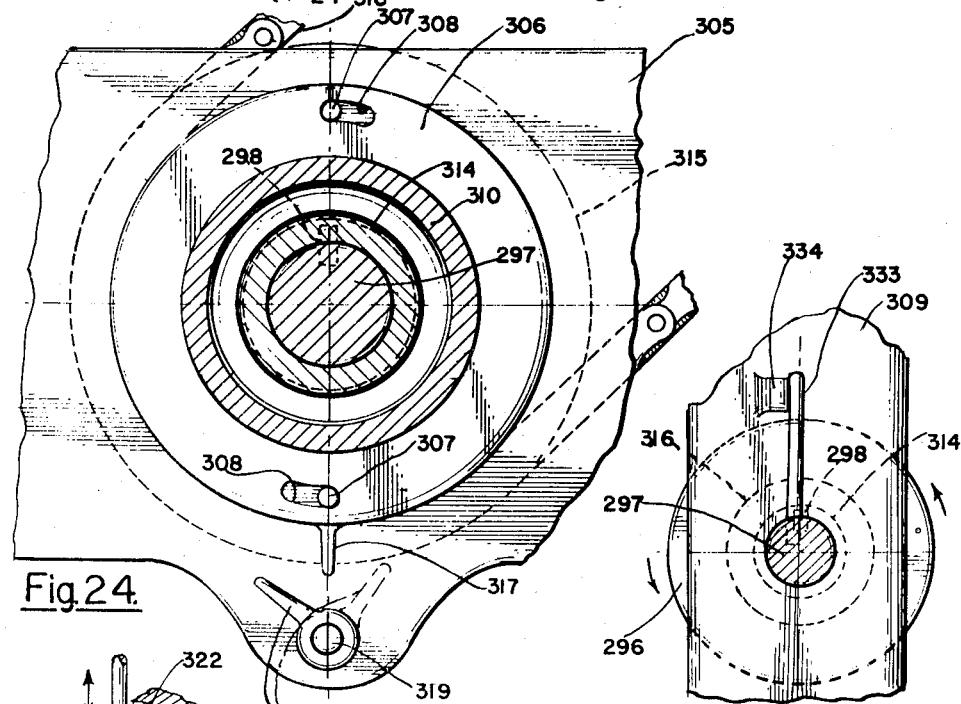
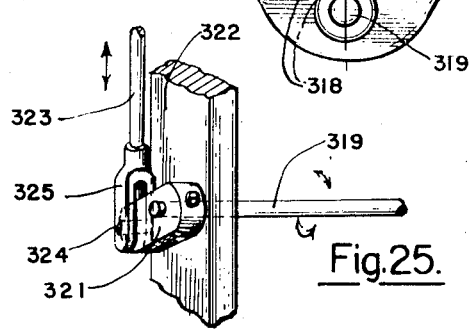
INVENTOR.
Robert F. Wheeler,
BY David Mauly Heller
Attorney

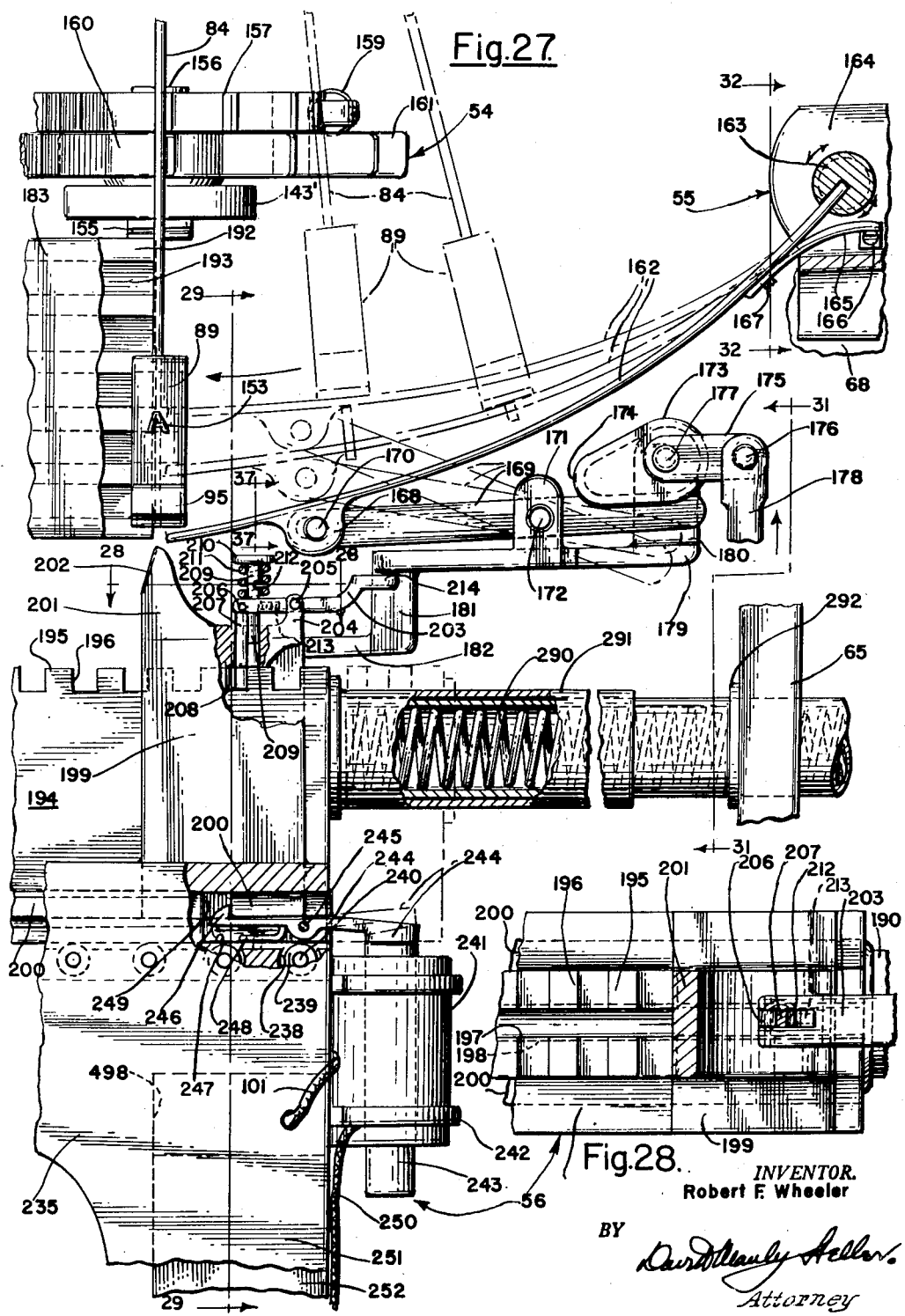

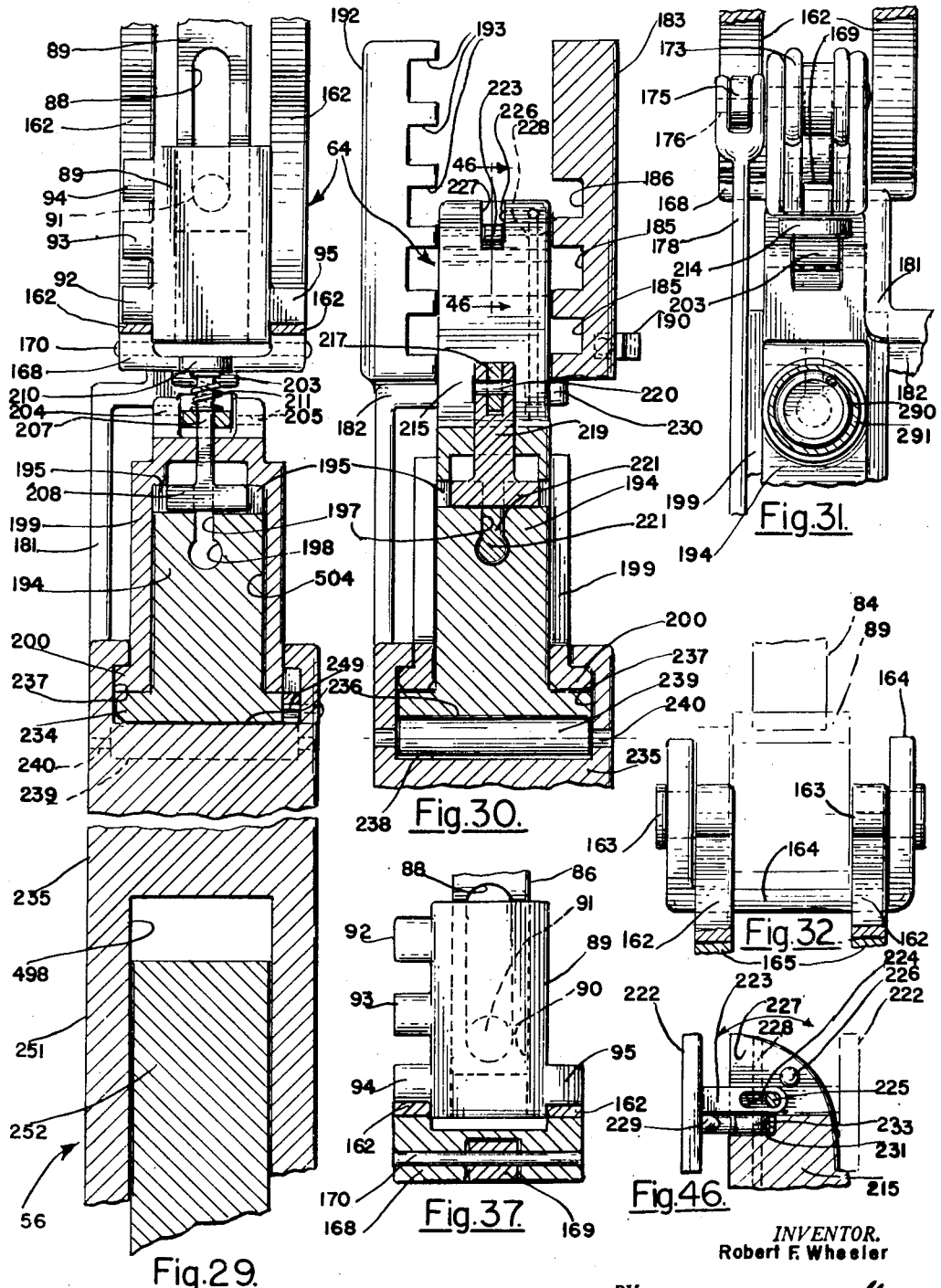

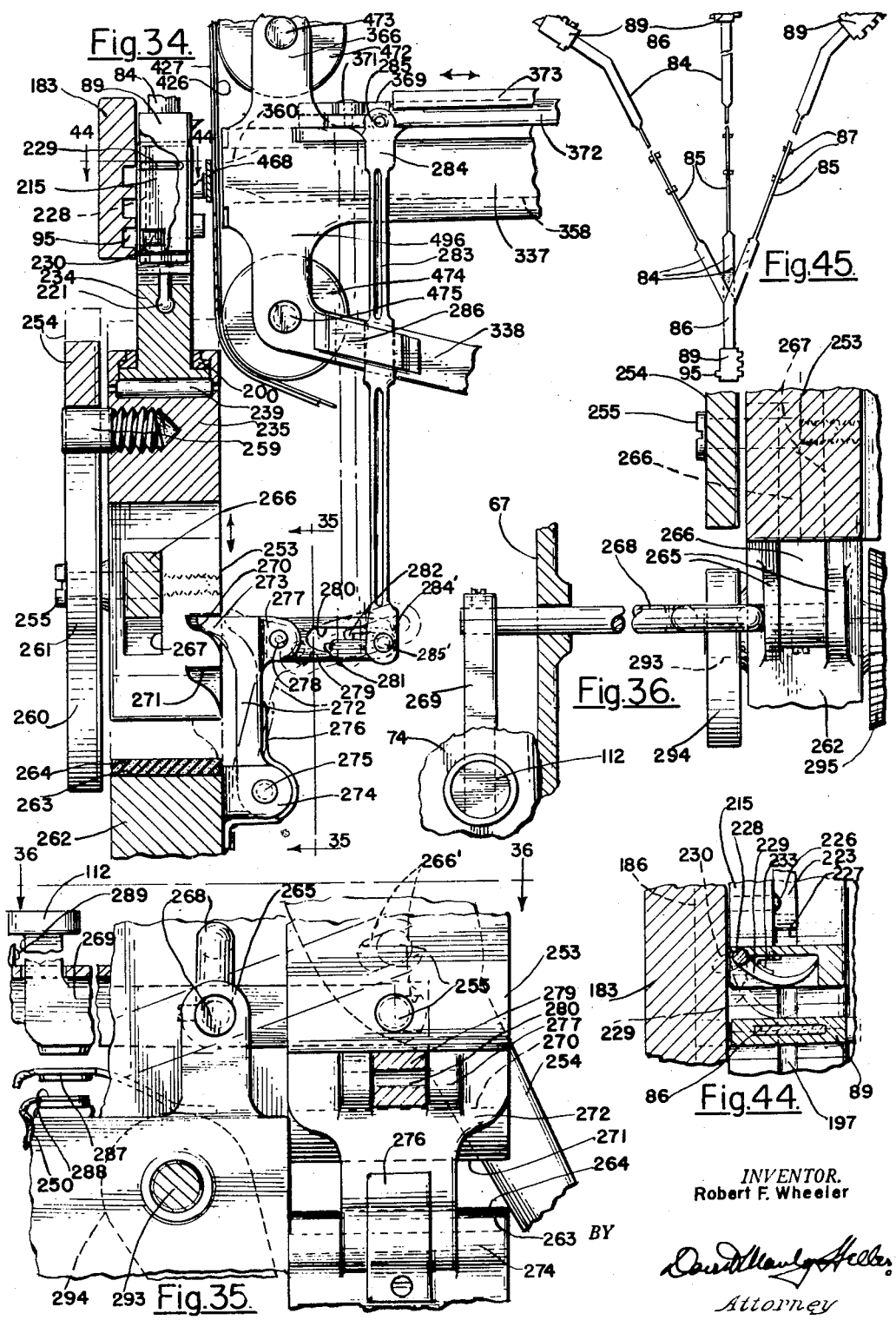

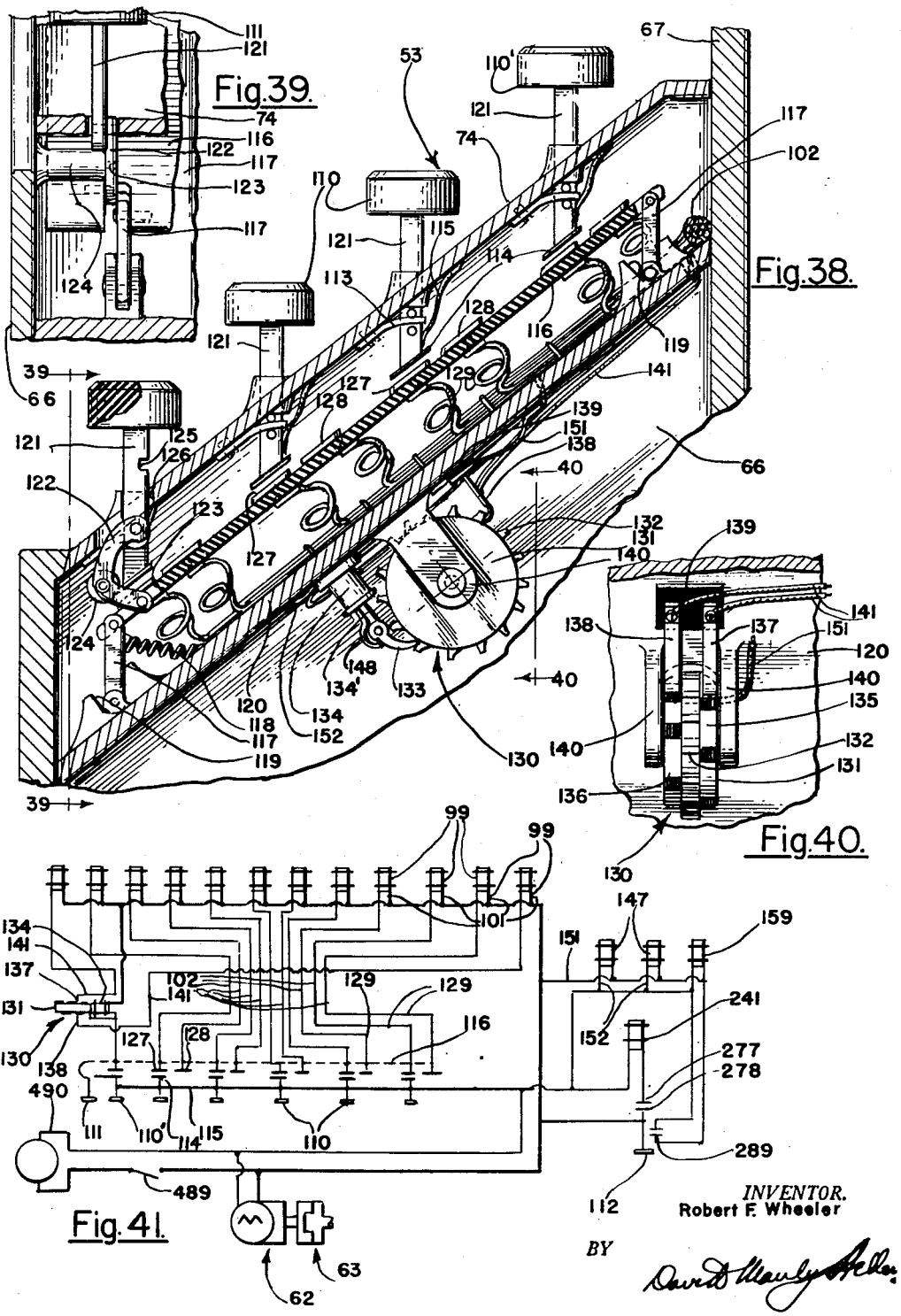
April 4, 1950     R. F. WHEELER     2,503,182
LINE-PRINTING TYPEWRITER
Filed Aug. 30, 1948     14 Sheets-Sheet 14
INVENTOR.
Robert F. Wheeler Patented Apr. 4, 1950

2,503,182

UNITED STATES PATENT OFFICE 2,503,182

LINE-PRINTING TYPEWRITER

Robert F. Wheeler, Chicago, Ill.

Application August 30, 1948, Serial No. 46,749

48 Claims. (Cl. 101—93)

My invention relates to line printing typewriters.

An important object of my invention is to provide a line printing typewriter for use principally in connection with the photo offset printing industry and allied branches of the printing craft, and which will accommodate, interchangeably, the use of regular job, book and news faces of type, and which will also accommodate the use of any and all different typographical forms and alphabets; such as, Arabic, Chinese, Japanese, and the like, by a simple and quick change-over operation of the type channel magazine means.

A further object of my invention is to provide a line printing typewriter that will print an entire type-line at a single printing operation, thus assuring an even impression on all the letters.

Another object of my invention is to provide a line printing typewriter which will produce exact and complete copy of a publication to be reproduced in quantity; the copy thus produced by the said line printing typewriter, being in the form which will end itself to photographic processes for master production plate printing, which in turn, may be used directly for reproduction purposes. My invention being distinguished from Linotype, or similar machines, in eliminating the necessity of making line slugs, or casts, requiring careful trimming for parallelism, and eliminating composition or arrangement of said slugs as well as "make-ready" thereof.

Another important object of my invention is to provide a line printing typewriter, having removably and interchangeably mounted therein, type magazine means, subdivided into individual type channel means each having a continuous circuitous path therein in which a multiplicity of type bars of like type faces are secured, confining the movement of the said type bars within the circuitous channels defined in the said type channel means, thus eliminating the need for complex assorting mechanism which is common structure in Linotype or like machines.

A further object of my invention is to provide a line printing typewriter that will produce lines of equal lengths; that is, pages or columns of typewritten material in which both the right hand and left hand margins are even. Furthermore, the width of the printed column may be varied within the limits required in the printing industry; that is, from a narrow column of type as used in newspaper, pamphlets and encyclopedias to the wider book size page of print.

A still further object of my invention is to provide a line printing typewriter in which the printed type line may be positioned at any desired location on the printed page, thus making it possible to leave spaces within the printed column or typewritten page for the insertion of graphic illustrations. This makes it possible to set up a printed page of typed material containing spaces for illustrations in one operation, instead of the two, or more, operations required by present practices.

A further object of my invention is to provide a line printing typewriter in which variable and adjustable spacing, or justifying, of the type-line provides equal spacing between the words within the said type-line, and thus overcomes the necessity of splitting words at the end of the line in order to stay within the margin.

A further object of my invention is to provide a line printing typewriter that permits the insertion of hair spaces for letter-spacing words and that provides the means of using any side-sorts or characters not presented on the keyboard.

A still further object of my invention is to provide a line printing typewriter which automatically presents new carbon ribbon and new tympan for each line as it is printed, thus assuring sharp impressions of uniform tone for the letters and characters throughout a page of typewritten material. This will make possible a sharp, clear impression of the letters and characters in the photo offset reproduction thereof.

A still further object of my invention is to provide a line printing typewriter having immediately available three choices of type faces; such as, "bold," "roman" and "italic," which can be used by the operator as required, or interspersed in the line as needed.

A further object of my invention is to provide a line printing typewriter in which any standard size of type may be used; such as, 6 pt., 8 pt., 10 pt., etc., and having the means for accommodating the paper feed to the various sizes of type, as well as having the adjustability to vary spaces between the type-lines at will.

A further object of my invention is to provide a line printing typewriter that may be operated from a standard typewriter or Linotype keyboard.

A still further object of my invention is to provide a line printing typewriter having automatic safeguard means making it impossible to shift a type-line from the assembly to the printing position until the said type-line has been completely filled with characters and spacers.

A still further object of my invention is to provide a line printing typewriter having printing stop means whereby an improperly assembled type-line may be cleared without being printed, and without advancing paper, tympan or carbon. This is an important feature of my invention, inasmuch as mistakes in type line assembling are often caught by the typist as soon as made and could be immediately corrected.

A further object of my invention is to provide a line printing typewriter having multiple oppositely disposed banks of the most frequently used type bars; such as, quad and leader bars, and having alternating means for alternately using the said type bars from first one bank, and then the opposite bank, to prevent either bank of type bars from becoming exhausted.

A still further object of my invention is to provide a line printing typewriter having the means for removing and replacing individual type bars from their type channels without removing the type channel in which they are mounted.

A further object of my invention is to provide a line printing typewriter having half em adjusting means on the line measuring rack to provide for type lines where half em spacing is required with respect to the marginal edges.

A further important object of my invention is to provide a line printing typewriter having synchronized mechanism to provide for shifting the type-line from the assembly to the printing position, to perform the printing operation, to return the type bars in a clearing operation, and finally, to return the line measuring rack to the assembly position. All the above-mentioned operations being motivated by the prime mover means and controlled by positive acting automatic clutch means.

A further object of my invention is to provide a line printing typewriter having positive action type bar impeller means, electrically connected to the keyboard, to insure the presentation of each type bar into its proper position in the line being assembled preparatory to printing.

A still further object of my invention is to provide a line printing typewriter that is compactly designed, and that may be easily operated with a minimum of controls.

Other objects and advantages embraced in my invention will be disclosed in the following description and the accompanying illustrations, in which like parts are designated by like numerals, and in which:

Fig. 2 is an elevational view of my invention with parts broken away, taken looking in the direction of lines 2—2 on Fig. 1, and showing the mounting of the channel magazine means, together with type bar and type face means, raised to inoperative position and with some type bars in suspended printing position, and showing type printing means and prime mover means.

Fig. 3 is a cross-sectional view of my invention, taken substantially on line 3—3 on Fig. 2, and showing a side view of the type channel magazine, together with type bar and type face means in both raised inoperative position and in suspended printing position, at the same time showing the type bar impeller means and the automatic clutch means.

Fig. 4 is an enlarged top view of the type-line printing means comprising an important part of my invention, partly in cross-section, taken looking in the direction of lines 4—4 on Fig. 2.

Fig. 5 is a cross-sectional view of the type-line printing means of my invention, taken substantially on line 5—5 on Fig. 4, and showing the operation of the printing platen.

Fig. 6 is an enlarged fragmentary cross-sectional view of a portion of the platen actuating cam wheel and cam wheel follower, taken substantially on line 6—6 on Fig. 5.

Fig. 7 is an enlarged side view, partly in cross-section, taken substantially on line 7—7 on Fig. 3 showing the location and operation of the type bar return means of my invention, together with adjustable paper feed means, which operates in association therewith.

Fig. 8 is an enlarged fragmentary view of a portion of the type bar return means, taken looking in the direction of lines 8—8 on Fig. 7.

Fig. 9 is an enlarged cross-sectional view of a portion of the type bar return means taken substantially on line 9—9 on Fig. 7, and showing in detail the friction gear means thereof.

Fig. 10 is an enlarged front view of the adjustable paper feed means of my invention, taken looking in the direction of lines 10—10 on Fig. 7, and showing the multiple paper feed ratchet wheel means, together with the adjustable ratchet pawl.

Fig. 11 is an enlarged side view, partly in cross-section, of the paper feed means of my invention, taken substantially on line 11—11 on Fig. 10, and showing in detail the mounting and operation of the adjustable paper feed pawl means, together with paper feed ratchet wheel means.

Fig. 12 is an enlarged fragmentary view, looking in the direction of lines 12—12 on Fig. 11, and showing the paper feed pawl actuating arm means.

Fig. 13 is an enlarged fragmentary cross-sectional view of a portion of the pawl arm actuating slide, slide-way and roller means connected with the paper feed means of my invention and taken substantially on line 13—13 on Fig. 11.

Fig. 14 is an enlarged perspective view of a portion of the type bar and type release means comprising important parts of my invention, and taken looking in the direction of lines 14—14 on Fig. 2.

Fig. 15 is an enlarged fragmentary perspective view showing in detail the mechanism of the type release means, together with its relationship to the type bar means of my invention.

Fig. 16 is an enlarged cross-sectional view, taken substantially on line 16—16 on Fig. 3, and showing details of the type face and type bar connecting means of my invention.

Fig. 17 is a fragmentary front view of the type face element of my invention, taken looking in the direction of lines 17—17 on Fig. 16, and showing letters of three fonts of type formed thereon.

Fig. 18 is an enlarged side view, partly in cross-section, of the type bar impeller means of my invention, taken looking in the direction of lines 18—18 on Fig. 3, and showing its operating relationship with a type bar.

Fig. 19 is an enlarged side view of the type bar assembly wheel of my invention taken looking in the direction of lines 19—19 on Fig. 3, showing its working relationship with a type bar drawn in phantom lines.

Fig. 19a is a top view, looking in the direction of lines 19a—19a on Fig. 19, and showing the mounting and solenoid actuating means of the type bar assembly wheel.

Fig. 20 is an enlarged fragmentary cross-sectional view of one of the type bar channels taken substantially on line 20—20 on Fig. 3, showing a type bar mounted therein.

Fig. 21 is a fragmentary view looking in the direction of lines 21—21 on Figs. 2 and 20, and showing a side view of a portion of the type bar channel means, together with portions of type bar mounted therein.

Fig. 22 is an enlarged fragmentary perspective view of the top section of one of the type bar channels, and showing a type bar insertion slot with that portion of a type bar drawn in solid and phantom lines to show the method of its insertion therein.

Fig. 23 is an enlarged cross-sectional view taken substantially on line 23—23 on Fig. 3, and showing the automatic clutch means of my invention.

Fig. 24 is an enlarged fragmentary view, partly in cross-section, taken substantially on line 24—24 on Fig. 23, and showing the radially motivated disc and limiting pin means of my invention, together with the motivating trip element thereof.

Fig. 25 is an enlarged fragmentary persepctive view of the connecting rod, link and axle means, which motivates the trip extension on the radially motivated disc.

Fig. 27 is an enlarged side view with parts broken away looking in the direction of lines 27—27 on Fig. 2, and showing the type face selector means, the type bar assembly wheel, the right hand marginal jaw, the rack moving spring, and the measuring rack releasing solenoid means.

Fig. 28 is a fragmentary top view, partly in cross-section, taken substantially on line 28—28 on Fig. 27, and showing details of the right hand marginal jaw, together with the line measuring rack.

Fig. 29 is a cross-sectional view, taken substantially on line 29—29 on Fig. 27, and showing details of the right hand marginal jaw mounted upon the line measuring rack and line measuring rack carriage assembly, together with type face and type face selector means.

Fig. 30 is an enlarged cross-sectional view, taken substantially on line 30—30 on Fig. 26, and showing details of the left hand marginal jaw, together with line measuring rack, type assembly bars and transfer carriage means.

Fig. 31 is a fragmentary view, partly in cross-section, looking in the direction of lines 31—31 on Fig. 27, and showing details of the type face selector actuating means and the rack moving spring.

Fig. 32 is a fragmentary view, partly in cross-section, showing the type face selector mounting means, looking in the direction of lines 32—32 on Fig. 27.

Fig. 33 is an enlarged fragmentary top view, partly in cross-section, taken substantially on line 33—33 on Fig. 5, and showing the platen stop means of my invention.

Fig. 34 is an enlarged view, partly in cross-section, taken substantially on line 34—34 on Fig. 26, and showing the operation of the carriage elevating and carriage dropping means of my invention, together with details of the line measuring rack and printing means in connection therewith.

Fig. 35 is an enlarged side view, partly in cross-section, taken looking in the direction of lines 35—35 on Fig. 34, and showing details of the carriage elevating means, together with the actuating line printing and type bar clearing control key.

Fig. 36 is a fragmentary cross-sectional view, taken substantially on line 36—36 on Fig. 35, and showing a top view of the line printing and type bar clearing control key, together with its connection of the carriage elevating means of my invention.

Fig. 37 is an enlarged fragmentary view, partly in cross-section, taken looking in the direction of lines 37—37 on Fig. 27, and showing the type face selector connecting lug, together with a type face element.

Fig. 38 is an enlarged cross-sectional view, taken substantially on line 38—38 on Fig. 1, and showing the keyboard means of my invention, including a side view of the quad and leader bar alternating means.

Fig. 39 is an enlarged fragmentary cross-sectional view, taken substantially on line 39—39 on Fig. 38, and showing the type shift key, together with its connection to the parallelogrammically actuated contact plate.

Fig. 40 is a fragmentary view, partly in cross-section, looking in the direction of lines 40—40 on Fig. 38, and showing an end view of the quad and leader bar alternating means of my invention.

Fig. 41 is a schematic electrical wiring diagram of my invention.

Fig. 42 is a fragmentary view, partly in cross-section, taken substantially on line 42—42 on Fig. 23, showing the brake stop and brake rod means in connection with the automatic clutch means of my invention.

Fig. 43 is an enlarged fragmentary, side view of the spacer element used in connection with the line justifying means of my invention.

Fig. 44 is an enlarged fragmentary cross-sectional view, taken substantially on line 44—44 on Fig. 34, and showing the safety lug means of my invention, which is mounted in the left hand marginal jaw.

Fig. 45 is a diagrammatic view of the type bar and type face means of my invention, shown in both the upright inoperative position, and the suspended printing position, and illustrating the angular formation of all off-center type bars to achieve coincidental alignment at assembly and printing positions.

Fig. 46 is a fragmentary cross-sectional view, taken substantially on line 46—46 on Fig. 30, and showing the mounting and operation of the half em gauging plate on the left hand marginal jaw.

Figure 1:
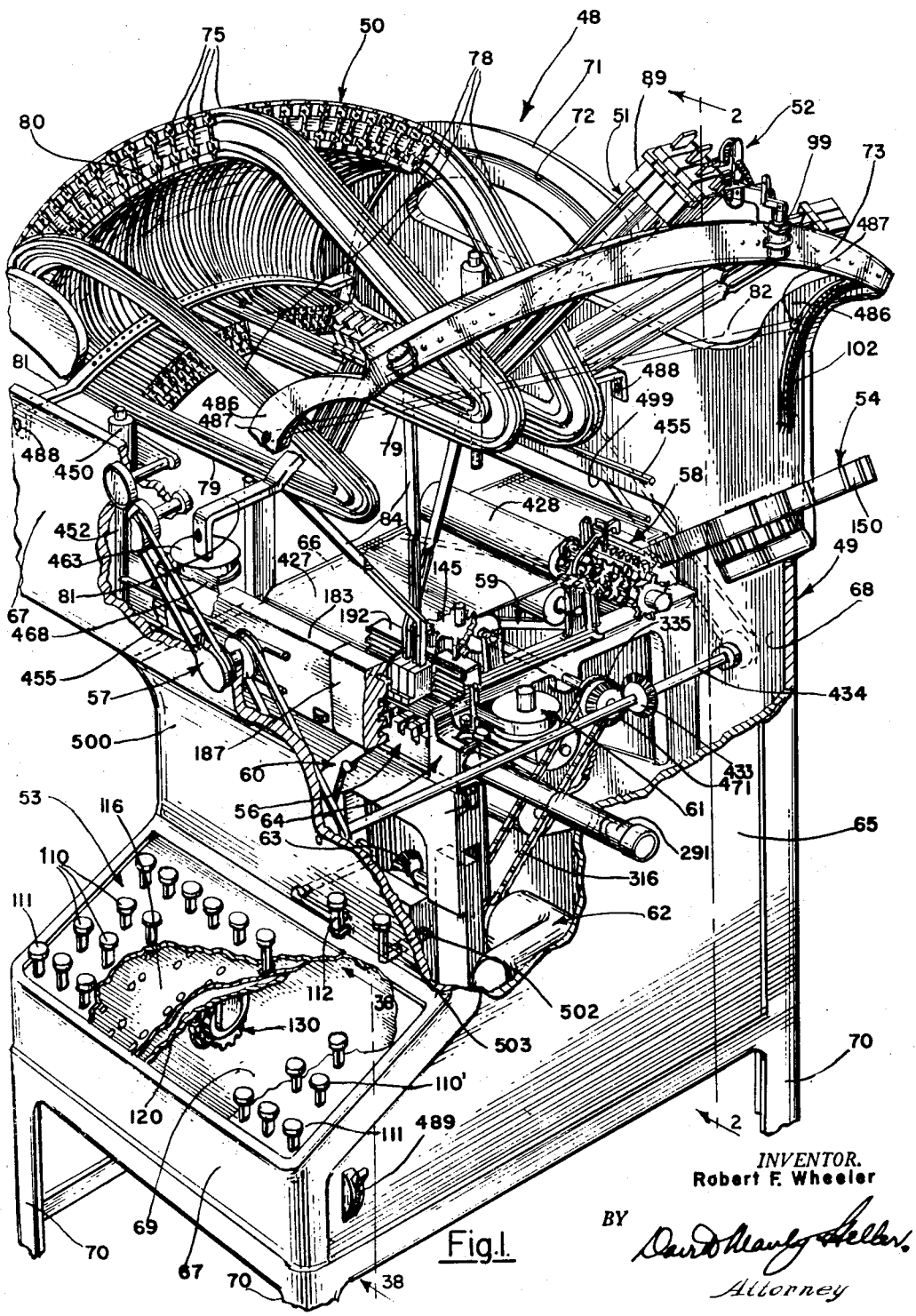
Fig. 1 is a perspective view of my invention with parts cut away, to show the mounting and working relationship of all of the principal working parts thereof.

My invention is generally designated 48, and consists of the following main sections: framework means 49, type channel magazine means 50, type means 51, type release means 52, keyboard means 53, type bar impeller means 54, type face selector means 55, type assembly and transfer carriage means 56, type bar return means 57, adjustable paper feed means 58, type-line printing means 59, transfer carriage return means 60, carbon ribbon feed means 61, prime mover means 62, automatic clutch means 63, and adjustable type-line retaining means 64; all located at least once in Figs. 1, 2, and 3.

A preliminary operational description includes as follows: A frame work means 49 in the top section of which is mounted, removably and interchangeably, the type channel magazine means 50, and on the lower front side of which is formed an inclined keyboard means 53. In the present invention, as will hereinafter be brought out, the said keyboard means 53 is electromatic, but it is to be understood that mechanical keyboard means could be substituted.

The type channel means are of rounded triangular shape, and are removably mounted at the top of the frame work means 49, as shown in Figs. 1, 2, and 3. The said type channel magazine means are mounted with their bottom, or straight portions, parallel, and with their top portions in outward fan-like formation resulting in an arc, the center lines of which would converge toward a common axial focal point just above the line-printing sections of the invention, as best shown in Fig. 2.

The type means 51 are multiple and are slidably mounted in groups, or banks, in the said type channels. An adjustable type face element 89 is slidably mounted upon the free end of each of the type means 51 and the banks of type bars are maintained in inoperative position upon the downwardly inclined magazine portions 78 of the type channels, as shown in Figs. 1 and 3, by multiple type release means 52, mounted upon a type release solenoid supporting bar 73.

Figure 26:
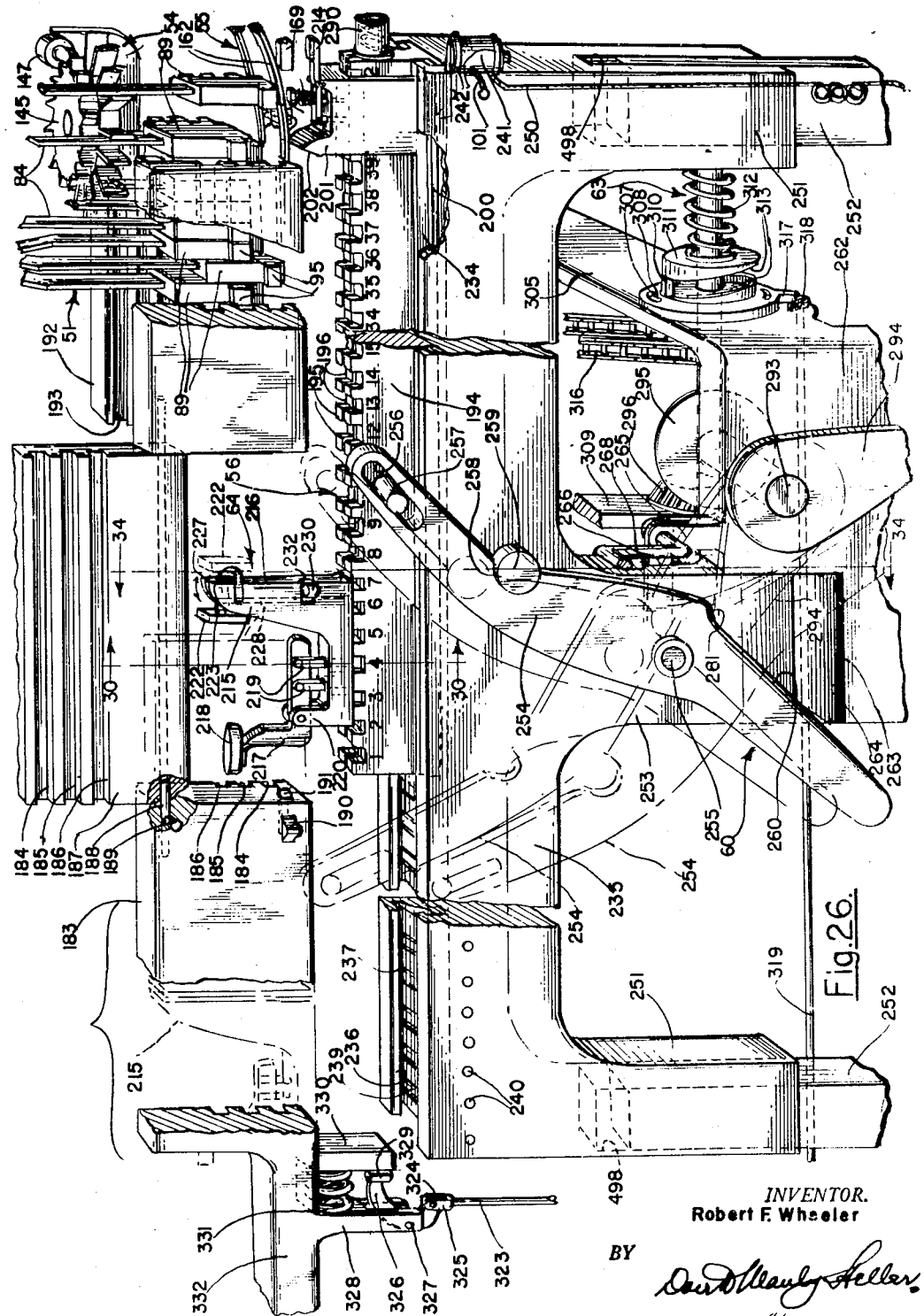
Fig. 26 is an enlarged perspective view with parts broken away, looking in the direction of lines 26—26 on Fig. 2, and showing type assembly and transfer carriage means, together with the transfer carriage return means and its operational connection with the automatic clutch means and the adjustable type line retaining means.

The type escapement solenoids, which are designated 99, are electrically actuated from the keyboard 53. When a type bar is dropped, or released, by type release means 52, it swings in a downward arc actuated by gravity, as illustrated in Figs. 1, 3 and 14, and its downward swing is given added impetus by type bar impeller means 54, and guided by type face selector means 55 and type bar assembling wheel 145 to enter the type line assembling station between type face alignment guide bars 183 and 192. When a type-line has been assembled in the said type assembling station, as illustrated in Figs. 1 and 26, it is confined between adjustable type-line retaining means 64. The left hand jaw of type-line retaining means 64 is designated 215 and having been adjusted to a proper position on line measuring rack 194, serves as a stop for the type-line as it is being assembled. The type-line is further held in assembly position by the said type face alignment guide and printing bed 183 on the front side, and the mating type face alignment guide bar 192 on its back, or type face side.

When the said type face elements 89 on the type bars 84 are vertically aligned with their type faces and type face selector lugs in the grooves of the type aligning bars 183 and 192, they form a type-line, as best shown in Figs. 26 and 27.

The line measuring rack 194, which carries the adjustable type-line retaining means 64 consisting of left hand jaw 215 and right hand jaw 199, rides upon the type assembly and transfer carriage means 56, as illustrated in Figs. 1, 26 and 27. The right hand marginal jaw, designated 199, is lower than the left hand marginal jaw, designated 215, as shown in Fig. 26. This is to provide clearance for the type face elements 89, as they swing into assembly position, as is best illustrated in Fig. 27. When the type-line has been assembled, the type assembly and transfer carriage means 56, together with the line measuring rack and adjustable type-line retaining means 64, are raised to a printing level, as shown by phantom lines in Fig. 26. The manual operation of raising the type assembly and transfer carriage means 56 to a printing level is performed by means of a line printing and type bar clearing control key, designated 112, mounted above the keyboard 74, and illustrated in Figs. 26, 34, 35 and 36, and located in Fig. 1.

The depressing of line printing and type bar clearing control key 112, besides lifting type assembly and transfer carriage means 56 to a printing level and simultaneously justifying the type-line, also actuates the measuring rack releasing solenoid 241, allowing rack moving spring, designated 290 and illustrated in Figs. 1, 26 and 27, to urge the said line measuring rack 194, together with the adjustable type-line retaining means 64 and the type-line, to a line printing position at the extreme left of the line measuring rack carriage assembly 235. As line moving rack 194 strikes contact stop 330 at the left hand side of the line measuring rack carriage, a trip means, to be hereinafter more fully described, trips and actuates an automatic clutch means 63, illustrated in Figs. 23, 24, 25 and 42 and located in Figs. 26 and 1.

The clutch shaft 291 is intermittently rotated by prime mover means 62 causing the gear holding bearing extension 314 to make one complete revolution when actuated by said automatic clutch means 63. A sprocket chain, designated 316, mounted on the said bearing extension 314, causes a printing drive sprocket wheel, designated 335, to make one revolution, as illustrated in Figs. 4 and 5 and located in Figs. 1 and 2. The said printing drive sprocket wheel 335, through platen drive shaft 336, actuates the type-line means 59. The first ninety degrees of its rotation causes a toggle urged horizontal action of the platen printing bar, designated 357, and best shown in Fig. 5.

Adjustable paper feed means 58 and carbon ribbon feed means 61, both to be hereinafter more fully described, provide the printing surface and printing means for the printing of the type-line by the striking action of the printing platen element 357. The said adjustable paper feed means 58 and carbon ribbon feed means 61 are best illustrated in Figs. 1, 2, 3, 4, 10, 11 and 12. The mechanism operating the said adjustable paper feed means 58 is actuated by a paper feed actuating bar 372, which is fixedly linked to, and operates with, the above-mentioned platen element 357 in the type-line printing operation. Also, attached to, and operating with the paper feed actuating bar 372, is a carriage locking arm connecting link, designated 283, which, together with the locking arm mechanism 272 is illustrated in Fig. 34. Thus, the advance and return motion of the printing platen 357, which is actuated by the first quarter turn of platen drive shaft 336, first causes the type-line to be printed, then advances the adjustable paper feed means 58, and ultimately, drops the line measuring rack carriage assembly 235. The said line measuring rack carriage assembly 235 is dropped to its lowermost position, as shown in Figs. 26 and 34, to allow clearance over the left hand marginal jaw 215 for the return of type means 51 to their normal resting position in the downwardly inclined portion of type channel magazine means 50.

The type bar return means, designated 57 and illustrated in Figs. 7, 8 and 9 and located in Figs.

1, 2, and 3, is actuated by bevel gear connection means on bearing extension 314. Also shown in Fig. 7 are the belt and pulley means connecting the type bar return mechanism driving shaft 434 with the type bar return arms 452, the fingers of which, designated 455, act to engage and cause the return of the type means 51 from the printing position to the normal inoperative position on the downwardly inclined magazine portion 78 of the type channel magazine means 50, as shown in Figs. 1 and 2.

Transfer carriage return means, generally designated 60 and illustrated in Fig. 26, is motivated through bevel gear connecting means 295 and 296 by the power clutch shaft 297. The transfer and lift cam 294, working in connection with elevating and rack transfer lever 254, causes the return of the line measuring rack 194 to its assembly position. The said transfer carriage return means 60 also lifts the line measuring rack carriage assembly 235 to its assembly position, as shown in solid and phantom lines in Fig. 26. The type assembly and transfer carriage means 56 is again in position to receive the type means 51 in assembly position, and the printing cycle of my type-line printing machine has been completed for one type line; in fact, the operator will have been assembling the second type-line during the above-described operations. My type-line printing machine is mechanically designed to permit the operator to operate the keyboard means 53 continuously and without interruption.

A more detailed description of the various parts comprising my invention is as follows: The frame work means thereof, generally designated 49 and best illustrated in Figs. 1, 2 and 3, consists of side frame portions 65 and 66, a front frame portion 67 and a back frame portion 68, together with a bottom frame portion 69 and leg portions 70. The tops of the front and back frame portions 67 and 68 are arcuately shaped to form magazine supporting portions 71, which are provided on their inner surfaces with arcuate grooves 72 terminating in straight grooved portions 72' for the type bar return mechanism. The front and back frame portions 67 and 68 are further provided with solenoid supporting bar extensions 486, between which is attached an arcuately shaped type release solenoid supporting bar 73. The front frame portion 67 is centrally recessed to provide for a keyboard recess portion 500 from which a keyboard face plate 74 tapers downwardly, as shown in Figs. 1 and 2.

An open window, not shown, may be provided in the front frame portion 67 to allow the operator to make whatever mechanical adjustments that may be necessary without leaving his position. A printed paper outlet window, designated 499, and shown in Fig. 1, allows the printed material 432 to be removed from the paper print container 431 at the rear of the machine.

The type channel magazine means of my invention, generally designated 50, consists of a plurality of type bar channels 75 mounted in an arcuate fan-like arrangement upon type channel magazine holding brackets 81. The said type channel magazine holding brackets 81 are removably attached to front and back frame portions 67 and 68 by magazine holding bracket attaching means 488, as shown in Fig. 1. This arrangement allows for the removal of the entire type channel magazine means 50, together with type means 51, for cleaning and adjusting purposes, or for replacement with different sizes of type or with different character type faces; such as would be required in printing any language not using Roman characters. This is one of the important features of my invention, as it allows the printing of books and pamphlets in any language which requires different type faces; such as, Chinese, Japanese or Arabic.

The said type bar channel 75 is of generally triangular shape with the two ends thereof arcuately formed, as best illustrated in Figs. 1 and 3. This provides for a straight, downwardly inclined type bar magazine portion 78 on the top, a straight type bar assembly and printing portion 79 on the bottom, and an arcuate type bar return portion 80 at the wide end. It is to be noted that each bank of type bars 84, containing like printing characters, operates in a continuous circuitous path, governed by the ambit of the respective channel in which the said bank is mounted, thus affording complete control of the type bars 84 in the particular bank referred to, eliminating the need for assorting means which is common construction in Linotype machines; hence, materially simplifying the operation of my machine. Each type bar channel 75 has formed thereon two sets of type bar retaining channel grooves 76 and lip portions 77 are provided upon its open outer edge, as is best illustrated in Figs. 20, 21 and 22, taken from Figs. 1 and 2. Into the upper portions of each type bar channel 75 is formed a type bar insertion slot 83. The said type bar insertion slot 83 is illustrated in Fig. 22, and has the said slot 83 formed at a slight angle to the perpendicular, so that when a type bar element 84 passes slot 83, the type bar retaining rollers 87 will not both register with the slot at the same time. The object of the type bar insertion slot 83 is for the insertion, or removal, of the said type bar element 84. A type bar locking rod 82 is shown in phantom lines in Fig. 1, and in position, extends between lock rod openings 487 in solenoid supporting bar extensions 486, to prevent the dropping of type bars 84 from the type bar magazine portions 78 when the typewriter is not in use. Hence, it is obvious that in order to use the line-typewriting machine, the said lock rod 82 must be withdrawn.

The type means, generally designated 51 of my invention, consists of a type bar element 84, having a channel engaging portion 85 and a type face holding portion 86. The said channel engaging portion 85 and type face holding portions 86 are separated by a ninety degree twist in the type bar element 84 in order to present the type face elements 89 in proper assembling and printing alignment, as illustrated in Fig. 20. Two type bar retaining rollers 87 are mounted on the channel engaging portion 85, and are spaced to ride in the type bar retaining channel grooves 76. The type face holding portion 86 is provided near its free end with a type face holding slot 88. A type face element 89 is cored at 90, as shown in Fig. 16, to provide sliding engagement with type face holding portion 86, which is slidably connected thereto by a retaining pin 91 having an engaging portion within the core 90. The said type face element 89 is preferably of a narrow rectangular shape, and has its printing side formed into a number of raised type faces. In the present instance, three type faces are illustrated and are named and designated as "Roman" 92, "Italics" 93, and "Bold" 94 from top to bottom, as illustrated in Fig. 17. The said type face holding slot 88 in type face holding portion 86 is of sufficient length to permit the sliding type face element 89 to be moved up or down to present any one of the three type faces 92, 93 or 94, for printing at the printing level.

The type bars 84 carrying such often used characters as punctuation marks, or spacers, will preferably be located at the center of the type channel magazine means 50. One of the type bar channels 75, preferably the center channel, will carry type bar spacer means 97, illustrated in Fig. 43. The said type bar justifying spacer means 97 consists of an S curved flat spring mounted on the end of the spacer bar 97. The said spacer bars 97, of course, are positioned between the assembled words of the type-line, or wherever a space, or a number of spaces, is required, as at the end of a paragraph. The type-line is justified by the said spacer bar means 97 to produce even margins on both right and left hand sides of the column of print as is required in book, pamphlet and newspaper printing. In operation, the type bar justifying spacer spring 98 adjusts itself and the type element 89 with which it is associated, to equalize, or justify, the spaces in the type-line when the said type-line is engaged by the line retaining means 64.

Type means 51 are normally held in reserve or in inoperative position on the type bar magazine holding portion 78, as best shown in Fig. 3, by type release means 52. The said type release means 52 is illustrated in Figs. 14 and 15, and consists of a type bar escapement support bracket 103, of which there is one for each bank of type bars, and each of which is mounted upon type release solenoid supporting bar 73. A bell crank 104 thereof is pivoted on an escapement support bracket 103, having one end articulately conneced by a pin 482 to the solenoid core 481 of an escapement solenoid 99, which is attached by means of solenoid holding clamps 100 to solenoid support bar 73. The other end of bell crank 104 is connected by link 105 to an escapement means 106, which is pivotably mounted by pin 483 to the end of escapement support bracket 103. The type bar escapement means 106, which is shaped like a bell crank, has a type bar escapement finger 108 formed on its lower extension. A resilient escapement finger attachment 484 is secured on the upper extension of escapement means 106, and has its terminus formed into a type bar escapement finger 109. A coil spring 107 serves to maintain the said escapement means 106 in a normal position against stop 480, so that the escapement actuated type bar end, designated 96 of the lowermost of the bank of type bars 84, will rest on escapement finger 108.

The escapement solenoid 99 is electrically grounded to the solenoid supporting bar 73 by ground wire 101. The other electrical connections thereof are carried by cable 102 and are held by cable holding clamps 485 to the keyboard means 53. When one of the keys, designated 110 or 110' on keyboard means 53 is depressed, the electrically actuated solenoid 99 connected thereto, causes escapement means 106 to tilt forwardly, with finger 108 releasing the lowermost type bar 84, while escapement finger 109 briefly engages the next type bar 84. As the spring urged escapement means 106 resumes its normal position, the finger 108 releasably engages and supports type bar end 96, thereby allowing the dropping of only one type bar at a time. The type bar 84 drops in an arcuate motion, as shown by dotted lines in Fig. 14 toward the type assembly position, which is illustrated in Fig. 1 and detailed in Fig. 26.

The keyboard means 53, heretofore referred to and illustrated in Figs. 38, 39, 40 and located in Figs. 1 and 2, consists of a keyboard face plate 74 on which are located in regularly spaced alignment, a number of type, leader and quad keys, designated 110 and 110'. The type keys 110 may be preferably located in an arrangement similar to that of a standard typewriter keyboard to permit an experienced typist to more easily operate my line-printing typewriter. The said keys 110 and 110' are held in upright arrangement on keyboard face plate 74, by key shank means 121, and are grounded thereto by ground wires 115. The lower end of shank 121 is provided with a flat, key contact point 114 parallel with keyboard face 74, as shown in Fig. 38. A key return spring 113, together with holding pins, serves to maintain the keys 110 and 110' in a normally raised position.

A parallelogrammatically actuated contact plate 116, made of an electrical insulating material, is mounted just below key contact points 114 and parallel with face plate 74 and supported by links 117 rotatably mounted on a bed portion 120, and held upright against stops 119 by coil springs 118, as shown in Fig. 38. The top surface of contact plate 116 is provided with a plurality of pairs of regularly spaced contact points, designated 127 and 128, each pair being mounted in alignment with one of the key contact points 114 just thereabove. The said contact points 127 and 128 are connected by contact wires 129 to solenoid cable 102. The contact points 127 actuate only solenoids mounted in connection with the lower case type faces, whereas the contact points 128 actuate solenoids mounted in connection with upper case type faces. It will be seen from Fig. 38 that normally, contact points 127 for the lower case type, are in alignment with key contact points 114; but that by rocking the contact plate 116 rearwardly, contact points 128 for the upper case type faces, will be brought into alignment with the said key contact points 114. This contact plate rocking motion is brought about by type shift keys 111, which are located preferably one on either side of the keyboard, as shown in Fig. 1, and as illustrated in detail in Figs. 38 and 39. The said type shift keys 111 have shanks 121 which are pivotally secured to bell crank 122 mounted on boss extensions 124 of the said framework means 49. The other end of bell crank 122 is pivoted to contact plate 116 within the slotted portion 123, so that by depressing type shift key 111, contact plate 116 is moved laterally to bring the upper case contact points 128 into alignment with type key contact points 114. In the event a number of upper case type faces are required successively, locking means are provided for type shift keys 111, consisting of a locking notch 125 in shank 121, together with a locking edge 126 in keyboard face plate 74, as shown in Fig. 38. It may be noted here that in the setting up of the type channel magazine means 50, a considerably greater number of type bars 84 of each character; that is, lower case and upper case type faces, are provided than would be used in a single type-line; specifically, it is desirable that not more than half of any bank of type bars be used in a single type-line. Since quad, or space, bars and leader bars are more often used in type-lines proportionately than type faces are used, I provide for two banks each of the quad and leader bars in the type channel magazine means 50. Preferably, the quad and leader bar channels are placed one on either side of the center of the said type channel magazine means.

In order to prevent the exhausting of either bank of quad or leader bars in a single typeline, I provide a quad and leader bar alternating means 130, illustrated in Figs. 38 and 40 and located in Fig. 1. The object of the said quad and leader bar alternating means 130 is to select quad bars, or leader bars, alternately from the two oppositely disposed banks of quad, or leader bars, in the channel magazine means 50.

An alternating contact wheel 131 is mounted between contact wheel bearing brackets 140 on the under side of keyboard bed 120, as shown in Fig. 38. Cogs 132 are formed in a center track on the circumference of alternating contact wheel 131. Two bands of alternately disposed contact points, designated 135 and 136, are positioned one on either side of the said row of cogs 132. Tips of contact brushes 137 and 138 alternately contact the said alternate contact points 135 and 136 as the contact wheel is advanced. The contact brushes 137 and 138 are mounted on insulation blocks 139, and are connected by electric wires 141 to solenoid cables 102. The alternating contact wheel 131 is grounded by contact wheel bearing brackets 140 to the frame of the machine. The solenoid 134 has a pawl 133 articulately mounted on its core 134'. The said solenoid 134 is so mounted on the under-side of the keyboard bed 120 that a pawl spring 148 will maintain pawl 133 in contact with one of the cogs 132, as shown in Fig. 38.

There is provided a quad and leader bar alternating means 130 in connection with the quad bar keys, and an alternating means 130 in connection with leader bar keys, which are commonly designated 110', as shown in schematic diagram, Fig. 41. The said quad and leader keys 110' are electrically connected to quad and leader solenoids 134, so that in operation, repeated actuations of keys 110' will, through quad and leader bar alternating means 130, alternately release quad or leader bars from first one, then the other of oppositely disposed banks of quad and leader bars in the type channel magazine means 50; thus preventing the possibility of either banks of quad or leader bars from becoming exhausted. The wiring diagram in Fig. 41 also shows the electrical connections between the keyboard means 53 and type release means 52.

Type bar impeller means, generally designated 54 and illustrated in Figs. 18, 19 and 19a and located in Figs. 1, 2, and 3, consists of two type bar auxiliary impeller wheels 144 and one type bar assembly wheel 145. The said type bar auxiliary impeller wheels 144 consist of impeller discs 149 which are mounted on assembly brackets 143 in approximately a forty-five degree angle to the vertical, as shown in Fig. 3. Type bar auxiliary impeller wheels 144 are provided with multiple resilient impeller arms 150 of sufficient length to allow for a slight over-lapping of their arcs of rotation, as best illustrated in Fig. 18, together, with a type bar 84, shown therebetween in phantom lines. Impeller ratchet gears 142 are fixedly attached, one on the under-side of each of the type bar auxiliary impeller wheels 144, and are provided with suitably spaced cogs, preferably one for each of the resilient impeller arms 150.

Actuating solenoids 147 are mounted on assembly brackets 143 in alignment with the said impeller ratchet gears 142, and ratchet pawls 146 are articulately mounted on the ends of the solenoid cores 147'. Pawl springs 148 maintain the pawls 146 in contact with the cogs of ratchet gears 142. Electrical contact wires 151 provide a common contact between solenoids 147 and all of the keys 110 and 110' of keyboard means 53, as shown in diagram Fig. 41. To further elucidate the purpose and working of type bar auxiliary impeller wheels 144, referring to Figs. 3 and 18, it will be seen that when a type bar is released, its gravity urged arcuate drop will carry it between the two auxiliary impeller wheels 144. By means of electrical connections 151 to keyboard means 53, the solenoids 147 are actuated each time a key 110 or 110' is depressed; therefore, as each type bar 84 is released, its downward arcuate movement, which at the start is gravitational, is further positively propelled by the rotational contact of one, or more, of the resilient impeller arms 150. The impeller wheels 144 are, of course, so timed in their rotational movement with respect to each other that the resilient impeller arms 150 of the two opposite auxiliary impeller wheels 144 will never contact each other, but will rather form an intermeshing pattern so that one of the arms 150 will necessarily contact and propel each of the arcuately dropping type bars 84.

The type bar assembly wheel 145, of which one is provided, is horizontally positioned to the right of the type assembling position. The said type bar assembly wheel 145 is provided with an assembling wheel 160 on which are radially formed a plurality of type bar assembly arms 161. A ratchet gear 157, similar to that described in connection with type bar auxiliary impeller wheels 144, is attached on the upper side of wheel 160, and a solenoid 159 is mounted on assembling wheel mounting bracket 143' and grounded by ground wire 152. A pawl 158, together with pawl spring 148, is mounted on core 159', and in connection with ratchet gear 157, provides rotating means for the said type bar assembly wheel 145.

The electrical connecting wire 151 also provides solenoids 159 with a common electrical connection to keys 110 and 110' on keyboard 53, so that each time one of the said keys 110 or 110' are actuated, the type bar assembly wheels 144 and 145 advance the distance of one of the cogs on the ratchet gear wheels 142 and 157. The type bar auxiliary impeller wheels and the type bar assembling wheel 144 and 145, respectively, are mounted on pins designated 154 and 156, which are provided with frictional brake means 155, as shown in Figs. 18 and 19. The purpose of the type bar assembling wheel 145 is to contact and to propel the type bars 84 into the type assembling position between the mating type face alignment guide bars 183 and 192 in intimate contactual arrangements referred to as the assembled type-line.

Type face selector means, generally designated 55, is illustrated in Figs. 27, 29, 31, 32 and 37 and located in Fig. 3. As hereinabove described under type means 51, it will be recalled that each individual type face element 89 has formed on its printing side, a number of printing type faces, in this case three are illustrated and designated as "Bold" 92, "Italics" 93, and "Roman" 94. The printing character on the type element 89 may be indicated on the back thereof by type face indicia 153, as shown in Fig. 14. A type face selector lug 95, as may be seen from Figs. 16 and 29, is oppositely disposed in horizontal alignment on type face element 89 with the lowermost of the type faces, designated 94. It will be further recalled that type face element 89 is vertically movable on type face holding portion 86. The function of the type face selector means 55 is to select and present the desired type face 92, 93 or 94, to a printing alignment with the type-line in the assembly station as the type bar means 84 drops into place at the said assembly station. The said type face selector means 55 consists of two arcuately formed type face selector rails 162 mounted in parallel alignment by their ends being fixed in slots in rotatable selector rail mounting pins 163 on selector rail extension bracket 164. Auxiliary spring supports 165 are secured at 166 on selector rail extension bracket 164, and attached at 167 on the under-side of the face selector rails 162. The auxiliary spring supports 165 serve to maintain the face selector rails 162 in their lowermost position, as shown in solid lines in Fig. 27, with the two raised positions shown in phantom lines.

A connecting lug 168 connects the free ends of the face selector rails 162 and a connecting pin 170 provides articulate connection thereto for the end of a type face adjusting lever 169, which is rotatably mounted by a bearing pin 172 between bearing portions 171 on a bracket 179. The said bracket 179 is attached to the typewriter frame by a frame bracket extension 182 and a bracket offset portion 181, as shown in Fig. 27. A cam bearing extension 180 formed at the end of bracket 179 supports cam means 173 by a link securing pin 177. The said cam means 173 has a recessed cam portion 174, which bears against the outer end of type face adjusting lever 169. A link 175 is fixedly attached to cam 173, and the end of an actuating rod 178 is rotatably mounted on its free end by link securing pin 176. A continuation of actuating rod 178 is shown in the locating Figs. 1 and 3. A secondary link 501 connects actuating rod 178 to a key rod 502, and a face selector key 503 is mounted on the keyboard 53 at the end thereof, as is shown in Fig. 1. The said face selector key 503 is provided with three locking positions (not illustrated) which, through linkage means 502, 501 and 178 provide actuating means for lifting the face selector rails 162 from their lowermost position, as shown in solid lines in Fig. 27, to either of the two raised positions shown in phantom lines in the same figure, for the purpose of either presenting the topmost type face, designated 92; or the centrally located type face, designated 93; or the lowermost type face, designated 94, to a horizontal alignment with the rest of the type faces in the assembly station. It may be seen from Figs. 29 and 37 that the face selector rails 162 are spaced far enough apart to allow clearance for the type face element 89 therebetween.

Type assembly and transfer carriage means, generally designated 56, is best illustrated in Fig. 26, with details in Figs. 27, 28, 29 and 30 and located in Figs. 1, 2 and 3. The general function of the type assembly and transfer carriage means 56 is to assemble and justify a type-line in the assembly station at the right hand side of the carriage, and to transfer the said type-line to the printing station at the left hand side of the carriage.

The type assembly and transfer carriage means 56 consists of a type face alignment guide and printing bed 183, which is fixedly secured at its left end to frame attaching extension 332, as is best illustrated in Fig. 26. The said type face alignment guide and printing bed 183 extends horizontally the full width of the line measuring rack carriage assembly 235, and is provided on its inner surface with three type face selector grooves 184, 185 and 186, which are laterally formed in spaced parallel alignment on the lower half of the inner surface thereof, and which serve as guide-ways for the type face selecting lugs 95. The three type face selector grooves 184, 185 and 186, maintain the desired type faces 92, 93 or 94 in printing alignment in the assembly and printing stations. The type face alignment guide and printing bed 183 is further provided with a swingable gate section 187 of a sufficient width to allow visual manipulation of left hand jaw 215 upon line measuring rack 194. The swingable gate section 187 is frictionally hinged by hinge pins 188 and friction retaining plugs 189, and is maintained in closed position by gate latch means 191, which is manipulated by gate latch release 190, as shown in Fig. 26.

A mating type face alignment guide bar 192 is mounted in oppositely disposed parallel alignment with type face alignment guide and printing bed 183. The said mating type face alignment guide bar 192 extends from the right hand end of type face alignment guide and printing bed 183 toward the left for approximately the width of a maximum type-line, to define a section which is known as the assembling station. On the inner surface of mating type face alignment guide bar 192 are formed a number of equal sized and parallelly aligned type face alignment groove 193. In the present instance, five alignment grooves 193 are illustrated to provide locating and guide-way means for maintaining any one of the three raised type faces 92, 93 and 94, in printing alignment at the assembly station. The mating type face alignment guide bar 192 is mounted on extension bracket 182, and its position in relation to type face alignment guide and printing bed 183 is best shown in Figs. 26 and 30.

A line measuring rack 194 is best illustrated in Figs. 26, 29 and 30, and is slidably mounted within rack supporting slide opening 236 on line measuring rack carriage assembly 235. The said line measuring rack 194 is held in position on line measuring rack carriage assembly 235 by line measuring sliding portions 234, riding on multiple rollers 239 mounted in roller recesses 238 by roller pins 240 within rack supporting slideways 237. The top surface portion of the said line measuring rack 194 is formed into multiple rack teeth 195, having multiple teeth roots 196 spaced therebetween. The said rack teeth 195 are evenly spaced apart in measuring units known in the printing industry as ems, and the said spaces, or ems, between the rack teeth 195, may be numbered from left to right, as shown in Fig. 26 for the convenience of the operator in adjusting the left hand and right hand marginal jaws, 215 and 199. The said left hand marginal jaw is of the same width as the line measuring rack 194, which is also the width of a type face element 89, and that of the space between the type face alignment guide and printing bed 183 and the mating type face alignment guide bar 192. The said left hand marginal jaw 215 is held in an upright position on line measuring rack 194 by jaw holding key 221 in jaw supporting keyway 197, which is enlarged at the bottom 198 to slidably hold marginal jaw 215. A releasable jaw retaining key 217 is pivotably mounted between bearing lugs 220 on left hand marginal jaw 215, as shown in Fig. 26. Locking pins 219 terminating in the said jaw holding keys 221 are pivotably secured to retaining key 217, which is provided with a manipulating portion 218. The releasable retaining key 217 may be mounted on retaining jaw 215, either frictionally, or by the use of a holding spring, not shown, to maintain the jaw holding keys 221 in locking engagement with rack teeth 195.

The standard line measuring unit in the printing art is known as the em; therefore, the rack teeth 195 are on a pitch of one em. However, it is sometimes desirable to start and finish the type-line at a half em, and a half em gauging plate 222, which is illustrated in Fig. 46 and located on Fig. 26, is utilized. The half em gauging plate 222 is articulately mounted by means of stem slot 224 in securing stem 223, together with pin 225 within a slot 227 at the top of left hand marginal jaw 215. The said half em gauging plate 222 is maintained by a spring detent 226 in the said slot 227 in either advanced operative position, as shown by solid lines, or in a retracted inoperative position, as shown by phantom lines in Fig. 46.

In the previously described operational procedure of my type-line printing machine, it was brought out that when a type-line had been assembled in the assembly station, it was then necessary to raise the line measuring rack carriage assembly 235 to what is known as the printing level. This is done by depressing the line printing and type bar clearing control key 112. The said control key 112 is located above the keyboard means 53, as shown in Figs. 1 and 2, principally to prevent the operator from accidentally and prematurely actuating the line printing operation controlled thereby.

To further prevent the accidental printing of an unfinished type-line, I provide a safety means, consisting of a safety lug 230 mounted on a vertical pin 228 in left hand marginal jaw 215. The safety lug means 230 is illustrated in Figs. 30, 44, and 46 and is located in Fig. 26. The said safety lug 230 is positioned within a slot 232 at the right hand lower edge of marginal jaw 215, and in alignment with the bottom edge of type face alignment guide and printing bed 183, when at its assembly position, as shown in Fig. 30. A safety claw 229 is fixed to pin 228 within a slot 231 at a higher point on the edge of marginal jaw 215 and, in operative position, projects from the front of type bar locating face 216. It may be seen from Fig. 46 that the said safety claw 229, while extending outwardly from type bar locating face 216 is positioned behind half em gauging plate 222 when the latter is in operative position; this, in no way interferes with the operation of either the gauging plate 222, or safety claw 229. The safety claw 229 and the safety lug 230 are maintained in their respective projected operative positions by a spring 233. In operation, the projecting safety lug 230 engages the lower edge of type face alignment guide and printing bed 183 to prevent the raising of the line measuring rack carriage assembly 235 to the printing level during the assembly of the type-line. When the type-line in the assembly position has been completely filled, pressure of the extreme left type face element 89 against claw 229 will cause the retraction of the said safety claw 229 into its slot 231, thereby causing the withdrawal of safety lug 230 into its recess 232, to permit the line measuring rack carriage assembly 235 to be raised to a printing level.

As may be seen from Figs. 26, 29 and 30, the right hand marginal jaw 199 rides directly upon line measuring rack carriage assembly 235 by means of its slide extensions 200. The said slide extensions 200 extend for the full length of carriage assembly 235, and are slidably positioned over the line measuring rack slide portion 234 within rack supporting slideways 237, as best shown in Figs. 29 and 30. As will also be seen by Figs. 29 and 30, the line measuring rack 194 passes through the cored portion 504 in the right hand marginal jaw 199.

Fig. 27 shows details of the right hand marginal jaw rack locking mechanism. A marginal jaw rack adjusting key 203 is mounted between key bearing lugs 204 by pin 205, and a primary half em spacer 207 is articulately secured to the end of marginal jaw rack adjusting key 203 by pin 206. Primary half em spacer 207 terminates in a lug extension 208, and the marginal jaw adjusting key 203 is provided with a manipulating portion 214, as shown by the detail in Figs. 27 and 28. The primary half em spacer 207 is of the width of one-half em, so that when used alone, it will space the right hand marginal jaw 199 to a one-half em space, which is used in connection with half em spacing means provided in left hand marginal jaw 215, when half em spacing is desired. To provide for full em spacing in right hand marginal jaw 199, a secondary half em spacer 209 is positioned beside primary half em spacer 207, and held in depressed operating position by a locking notch 212 therein, and a cooperating spring locking pin 213 in marginal jaw adjusting key 203. A coil spring 211, positioned between marginal jaw adjusting key 203 and a manipulating portion 210 on secondary half em spacer 209, serves to maintain the said secondary half em spacer 209 normally in a raised inoperative position, as shown by solid lines in Fig. 27.

The principal purpose of the left hand and right hand marginal jaw 215 and 199 is to hold and automatically justify the type-line when it has been completed in the assembly station. Since, as hereinabove described, the line measuring rack 194 is adjustable through right hand marginal jaw 199, and left hand marginal jaw 215 is adjustable on line measuring rack 194, any length of type-line up to a book page width may be assembled in the assembly station. The assembled type-line may also be positioned at any desirable location horizontally on the printed page at the line printing level. Specifically, it is possible to leave a space on the printed page for an illustration, and to have type matter on either or both sides thereof by adjusting the line measuring rack 194 to the right, or by adjusting the left hand marginal jaw 215 either to the right or to the left to position the assembled type-line wherever desired on the said printed page. I wish to stress this as one of the important features of my invention.

Fig. 27 also illustrates a detailed view of the line measuring rack locking and releasing mechanism. A measuring rack releasing solenoid 241 is secured to the right end of line measuring rack carriage assembly 235 by solenoid mounting clamps 242. A latch lock 244 is articulately mounted by a pin 245 within latch clearance slot 247, at the right hand end of line measuring rack slide portion 234. A latch tooth 246 is formed on the end of articulate latch lock 244 and is held by a latch spring 248 in normal engagement with a latching cut-out portion 249 formed near the end of right hand slide extension 200. The free end of articulate latch lock 244 engages the end of solenoid core 243. Solenoid 241 is properly grounded, and is connected by an electrical wire 250 to line printing control key 112.

Referring to Fig. 35, it will be seen that electrical connection between ground contact 287 and solenoid connection contact 288 will not be effectuated until the control key 112 has been depressed to the fullest extent; that is, the measuring rack releasing solenoid 241 will not be actuated to release line measuring rack 194 until the line measuring rack carriage assembly 235 has been raised to the printing level. The said action of elevating the line measuring rack carriage assembly 235 causes the tapered portion 202 of right hand marginal jaw gauging tooth 201 to slidably and forcefully engage the right end of the assembled type-line. The said type-line is held under pressure between the left hand and right hand movable jaws 215 and 199, thereby equalizing the type bar justifying spacers 98. This is called justifying the type-line.

A coiled rack moving spring 290, which is necessarily of considerable length, is contained within a telescoping spring housing 291, the outer part of which is secured by attaching shoulder 292 to the frame 65, and may project therethrough. The inner end of telescoping spring housing 291 contacts the right hand end of line measuring rack 194, as best shown in Fig. 27, which illustrates the said line measuring rack 194 in a type assembly position, and shows rack moving spring 290 in a compressed or charged condition. When the line printing and type bar clearing control key 112 is depressed, it performs three operations: First, an electrical contact 289 is made to type bar assembly wheel solenoid 159. Secondly, the line measuring rack carriage assembly 235, together with the line measuring rack 194 and the left and right hand marginal jaws 215 and 199 with the assembled type-line, are raised from assembly level to printing level, during which operation the tapered portion 202 of right hand marginal jaw 199 forcibly engages the right end of the assembled type-line to contain and justify the said assembled type-line, as hereinabove described. The said line printing and type clearing control key 112 elevates the line measuring rack carriage assembly 235 through key extension 269 attached to key connecting shaft 268, which is attached to a carriage elevating arm 266. The said carriage elevating arm 266, which is shown in Figs. 34, 35 and 36 is pivotably mounted between bearing lugs 265 on frame bracket support 262. The tip of carriage elevating arm 266 enters an elevator arm clearance slot 267 in elevating extension 253. Bifurcations 266' in the tip of elevating arm 266 engage transfer lever mounting shoulder screw 255, as shown in Fig. 35, to cause the elevation of carriage assembly 235 through leverage when the said line printing and type bar clearing control key 112 is depressed. Third, as the said control key 112 is completely depressed, it actuates release solenoid 241 through electrical contact points 287 and 288 thereon, to release the line measuring rack 194, together with the assembled and justified type-line held between left hand and right hand marginal jaws 215 and 199. The spring urged line measuring rack 194 with its assembled type-line, upon being released, will move toward the left to the printing position, as shown in Fig. 26 by dotted lines.

The type bar elements 84, on which the type face elements 89 are secured, are slidably suspended in the assembling and printing stations from the type bar assembly and printing portions 79 of the type bar channels 75. The type bar elements 89 of the type-line, besides being confined between marginal jaws 215 and 199, are guided by one, or more, of the type face selector grooves 184, 185 and 186 in the type face alignment guide and printing bed 183 as the type-line moves to the left toward the printing position. The line measuring rack 194 is stopped and located at the printing station by a spring held contact block 330 mounted by a spring 331 on an attaching extension 332. A bell crank 326 is mounted by a pivot pin 327 within bell crank supporting bracket 328 on the under side of attaching extension 332, as shown in Fig. 26. An actuating portion 329 of bell crank 326 is actuated by contact plate 330 when line measuring rack 194 reaches the printing position.

A fork connecting rod 323, having bifurcations 325, is connected by pins 324 between bell crank 326 and link 321, and provides connection therebetween for trip element mounting axle 319. Details of the mounting axle 319 and link 321 are shown in Figs. 23 and 25. A trip element 318 is mounted on the other end of axle 319, which has a bearing in an intermediate supporting web 305. The said trip element 318 serves, when rotated, to actuate a mating trip extension 317 located in alignment therewith on the circumference of a radially motivated disc 306. A return spring 320 mounted on axle 319 maintains the said trip element 318 normally in a cocked position, as shown by solid lines in Fig. 24.

The said ardially motivated disc 306 comprises a part of the automatic clutch means, generally designated 63, and illustrated in Figs. 23, 24, 25 and 42 and located in Figs. 1 and 26. The said automatic clutch means 63 consists of a clutch shaft 297 journaled within the bearing extension 299 of a clutch housing 301, which is rotatably mounted between frame attached supporting webs, designated 300. The said clutch housing 301 is fixedly attached to the drive shaft of the prime mover means, generally designated 82, and shown in Figs. 1 and 2, and which provides continuous rotary motivation to clutch housing 301. An adapter connecting link 304 is fixed to the end of clutch shaft 297 within the clutch housing 301, and is connected by radiating links 303 to clutch elements 302.

A compression spring 312 is coiled about clutch shaft 297 between a collar 299', against bearing extension 299 and a mating intermediate slip tooth clutch 311, which is pinned to clutch shaft 297. Tapered clutch actuating portions 313, concentric with clutch shaft 297, are formed in oppositely disposed contactual relationship on the adjacent surfaces of intermediate slip tooth clutch 311 and intermediate slip tooth clutch 310, as shown in Fig. 23. The said slip tooth clutch 310 is formed as an integral part of the motivating disc 306 which rides on the shaft 297.

A bevel gear 296 and a sprocket wheel 315 are formed on the bearing extension 314, which is mounted on clutch shaft 297 and keyed slidably thereto by feather key 298. The said bearing extension 314 is prevented from lateral movement on shaft 297 by a flange 314' in connection with intermediate supporting web 305. Movement limiting slots 308 are oppositely formed near the outer circumference of the said radially motivated disc 306, and connecting pins 307 fixed in intermediate supporting web 305 have their ends extending into the said movement limiting slots 308. A brake rod 333 is radially fixed at the left end of clutch shaft 297. A brake stop 334 is formed, or mounted, on frame support web 309 and within the radius of the said brake rod 333.

The inoperative position of my automatic clutch means 63 is shown in solid lines in Fig. 23 in which, it will be noted, that brake rod 333 rests against brake stop 334 and that intermediate slip tooth clutch 310 and mating slip tooth clutch 311 are held in normal disengagement by the high points of the respective tapered clutch actuating portions 313. The clutch elements 302 are shown in retracted and non-engaging position within clutch housing 301. The mating trip element 318 is rotated, or actuated, by bell crank 326 through connections 323, 321 and 319, as the line measuring rack 194 strikes spring held contact block 330. The said rotating mating trip element 318 actuates the trip extension 317 to radially motivate disc 306, together with slip tooth clutch 310 in a counter-clockwise direction to the limit of limiting slot 308, as shown in Fig. 24. Urged by coil spring 312, a closing engagement is effectuated between the oppositely disposed tapered portions 313 of the said intermediate slip tooth clutch 310 and its mating slip tooth clutch 311. Since mating intermediate slip tooth clutch 311 is fixedly attached on clutch shaft 297, the said clutch shaft 297 is moved laterally to the left, urged by the said compression spring 312. The left hand movement of clutch shaft 297 frees brake rod 333 from brake stop 334, and at the same time by toggle action, causes frictional engagement between clutch element 302 and the said rotating clutch housing 301. Rotational movement is thus imparted to the clutch shaft 297, together with bearing extension 314 connected thereto by feather key 298. Rotational movement is also thereby imparted to sprocket connection 315 and bevel gear 296 mounted on the said bearing extension 314. As clutch shaft 297 makes its clockwise revolution powered by clutch housing 301, the mating slip tooth clutch 311 fixedly mounted thereon, turns against the tapered clutch actuating portion 313 on intermediate slip tooth clutch 310. In revolving, the said mating slip tooth clutch 311, together with power shaft 297, is moved to the right so that as power clutch shaft 297 completes one revolution, it will cause a disengagement between clutch elements 302 and clutch housing 301, and the clutch shaft is stopped at the completion of one revolution by brake rod 333 contacting brake stop 334. The single revolution of clutch shaft 297 imparts a single revolution to printing drive sprocket wheel 335 through sprocket connection 315 and sprocket chain 316, since the said sprocket wheel 335 is of the same diameter as sprocket connection 315.

The type-line printing means, generally designated 59, is illustrated in detail in Figs. 4, 5, 6 and 33 and located on Figs. 1 and 2. The said type-line printing means 59 consists of a platen support frame 337, having an end portion 361, which is attached to side frame 68 by mounting lugs 362 and further supported by paper feed roll mounting webs 338. A boss 339 formed on paper feed roll mounting web 338 provides journaling for the platen drive shaft 336, on the outer end of which is mounted the printing drive sprocket wheel 335, as shown in Fig. 4.

Platen slideways 359 are formed in parallel alignment on the inside surfaces of the two sides of platen support frame 337. A platen element 357 is mounted by means of platen slide extensions 358 in the said platen slideways 359. A reduced platen printing surface 360 is formed on the front edge of platen element 357 in horizontal alignment with the type-line printing position. Plunger bores 354 are formed, one in either end of the inner surface of the said platen element 357, oppositely disposed to plunger bores 355 formed in the platen support frame end portion 361, as shown in Figs. 4 and 5. The mating ends of toggle levers 349 and 350 are pivotably mounted on connecting pin 348. Toggle levers 349 are pivotably connected by pivot pins 351 to toggle lever plungers 353 within plunger bores 354. Toggle levers 350 are connected by pivot pins 352 to toggle lever plungers 353 within plunger bores 355. Plunger springs 356 are held within plunger bores 354 and 355 by the said toggle lever plungers 353, as best shown in Fig. 5. A platen actuating cam wheel 340 is mounted on the inner end of platen drive shaft 336 and is provided with a cam groove 341, having an actuated portion 342 for about ninety degrees of its circumference, as shown in dotted lines in Fig. 5. A cam roller 343, which is mounted on a cam axle 344 and rides within the cam groove 341, is connected by cam follower 345 to connecting pin 348. The said cam follower 345 is limited to a vertical movement by follower guide rollers 347 mounted on either side of connecting pin 348 within follower guide bracket 346.

The relative positions of the various component parts of the line-printing means 59, at rest, is shown in Fig. 5 with the cam roller 343 at the top of cam groove 341 at the end of the dwell period and at the beginning of the actuating portion 342 of the cam groove 341. A clock-wise rotational movement of cam wheel 340 will, during the first ninety degrees of revolution, cause a forceful strike and return movement in a horizontal plane to platen element 357 through cam follower 345 and toggle levers 349 and 350, as shown by dotted lines in Fig. 5. During the remaining two hundred seventy degrees of revolution of cam wheel 340, the cam roller 343 rides in the dwell section of cam groove 341.

Adjustable paper feed means, generally designated 58, and a carbon ribbon feed means, generally designated 61, co-operate to complete the printing operation. The said carbon ribbon feed means 61 consists in the present invention of two carbon feed spools 463 mounted on pins 464, and held in vertical alignment on oppositely disposed carbon ribbon mounting brackets 469 and 470, one on either side of platen support frame 357, as best shown in Figs. 3 and 4. A carbon ribbon 468 is wound within the confines 467 of the said carbon feed spools 463, and is disposed therebetween in registry with the type-line means and the printing paper 427.

In order to produce sharp and clearly legible characters on the printed paper 427 for each type-line, it is desirable to present a fresh and unused section of the carbon ribbon 468 for each printing operation. A bevel gear 465 is mounted on the lower end of the spool axle 464 on the left hand side of platen support frame 337, as shown in Fig. 3. The said bevel gear 465 co-operates with a larger driving bevel gear 466 mounted on the end of the lower paper roller shaft 475. The said paper roller shaft 475 is caused to make a partial revolution, in a manner hereinafter to be more fully described, immediately following the paper printing operation. The said partial revolution of larger driving bevel gear 466 will impart a sufficient rotation to meshing bevel gear 465, to cause the advance of carbon ribbon 468 sufficiently to present a new surface thereof for the next printing operation.

The adjustable paper feed means 58 consists of a roll of paper stock 478 mounted on shaft 479 between the paper feed support webs 338, as best shown in Figs. 2 and 3. Since printing paper, designated in this instance 427, is usually of a thin and light weight fabrication, the forceful contact of the raised type characters in the printing operation would produce indentations in the said printing paper 427, making for the blurred and irregular printed character, as may be observed in ordinary typewritten matter. To overcome this condition, I provide a roll of tympan stock 476, which is preferably a heavy finished type of paper or semi-cardboard stock, and a continuous length of which, designated 426, is fed together with the printing paper 427 over the upper and lower paper retaining rollers 472 and 474, as shown in Fig. 2. The roll of tympan stock 476 is mounted upon shaft 477 between paper roller support webs 338, and is so positioned that the length of tympan stock 426 will be fed on the inside or back of the paper stock 427 as it passes over paper retaining rollers 472 and 474. The said paper retaining rollers 472 and 474 are mounted upon shafts 473 and 475 between paper support webs 496 on the bottom and support webs 366 on the top, and are so positioned to present a surface of the printing paper 427 between the carbon ribbon 468 and the platen printing surface 360, as best shown in Fig. 2. The lengths of paper stock 427 and tympan 426 are drawn between mating feed rollers 428 and idler roller 417, as shown in Fig. 10. The said feed and idler rollers 428 and 417 have the prime function of advancing the printing paper 427 after each printing operation. The printed paper 427, together with the tympan 426, is collected in folds 432 in the paper print container 431 at the rear of the machine, as shown in Figs. 2 and 7.

The paper advance mechanism of paper feed means 58 is best illustrated in Figs. 4, 7, 10, 11, 12 and 13.

Referring to Figs. 4 and 11, it will be seen that an actuating bar 372 is slidably mounted within actuating bar slideway 373 on actuating bar support ledge 374 on the left hand side of platen support frame 337. The said paper feed actuating bar 372 is connected through a rivet 371 in paper feed actuating bar connector 370 and connecting link attachment 369 to printing platen 357. The other end of paper feed actuating bar 372 is downwardly tapered to form a cam surface 376. The said paper feed actuating bar 372 being fixedly connected to platen 357; therefore, is caused to move laterally within its slideways 373, first to the left, then to the right, as the printing platen 357 is actuated during the printing operation. The left hand motion of paper feed actuating bar 372 is limited by stop 375 on the support ledge 374. An upright slideway support 377 is mounted on the top surface of platen support frame 337, and a vertical slide 379 rides within the slideway 378 formed therein. A cam roller 380, together with a bearing 381, is mounted by a roller retaining screw 382 on the lower end of slide 379 in position to normally rest upon the top of cam surface 376, as shown in Fig. 11. A paper feed pawl actuating arm 386 is hinged to the top of upright slideway support 377 by hinge pin 387, and is articulately connected to slide 379 and held in a normal horizontal position by a link 383 pivoted thereto at points 384 and 385, as shown in Fig. 12.

The said paper feed roller 428 and idler 417 are mounted upon shafts 418 and 416 respectively, between web extension 322 and paper feed ratchet support 389. Mounted upon the projecting end of roller shaft 418, in spaced arrangement, are six paper feed ratchet wheels, designated 420, 421, 422, 423, 424 and 425, from left to right, as shown in Fig. 10. The cogs, or ratchet teeth, 419 on the above enumerated paper feed ratchet wheels are formed in progressively wider spaced arrangement upon the circumferences of each ratchet wheel from left to right to accommodate a paper advancing movement, varying progressively in unit paper advancing distances for use in connection with the 6 pt., 8 pt., 10 pt., 12 pt., 14 pt., and 18 pt., type faces respectively. My invention is not limited to the above enumerated sizes of type faces, as more ratchet wheels carrying more widely spaced cogs for type faces above 18 point may be added, if desired.

A locking feed adjustment bar 391 is mounted on paper feed support extension 390 above, and parallel to, the said aligned ratchet wheels. The said lock feed adjustment bar has six adjusting latch notches, designated 392, 393, 394, 395, 396, and 397 on its upper surface, as shown in Figs. 10 and 12, and a stop pin 398 on its outer extremity. The said adjusting latch notches may be provided with indicia 497, as shown in Fig. 12. A pawl adjustment slide 399 is mounted by means of a cored slideway 400 over the lock feed adjustment bar 391 and may be held in aligned adjustment with one of the ratchet wheels 420, 421, 422, 423, 424 or 425 by means of a locking latch 401 in one of the above enumerated adjusting latch notches. The said locking latch 401 is attached by pin 402 to one end of a bell crank 403, which is mounted by bell crank pivot pin 404 on mating handle extension 406. The other extension of bell crank 403 is designated 405 and operates in connection with mating handle extension 406 to lock or unlock the pawl adjustment slide 399 on lock key adjustment bar 391. A spring 407 normally maintains the latch locking position. A pawl handle 408 is mounted by pivoting pin 409 within pawl slot 429 in pawl adjustment slide 399, as shown in Figs. 10 and 11. The tip of a curved, handle riding extension 410 on one end of pawl handle 408 rests upon the surface 388 of paper feed pawl actuating arm 386, and a feed pawl 411 is pivoted by pin 412 to its other end. A feed pawl spring 414 is mounted between feed pawl leg extension 413 and mooring hub 415 to maintain the point 430 of the said feed pawl 411 in contact with one of the ratchet teeth 419. In Figs. 10, 11 and 12, the pawl adjustment slide 399 is set with feed pawl point 430 in contact with one of the cogs 419 on ratchet wheel 421 for operation in connection with 8 pt., type. Observing Fig. 12, it will be seen that the downwardly swinging motion of the paper feed pawl actuating arm 386 will impart a progressively greater arc of movement to pawl handle 408 as the pawl adjustment slide 399 is moved from one adjustment station to another toward the left; that is, from 6 pt., to 8 pt., 10, 12, 14, etc. In this way the arcuate ratchet advancing action of the pawl actuating arm 386 will be adjusted to the different spacings of the cogs 419 on the ratchet wheels 420, 421, 422, 423, 424 and 425.

Referring to Fig. 11, the vertical motion imparted to slide 379 through its roller 380 resting upon cam surface 376, is first downwardly as the paper feed actuating bar 372 moves toward the left, followed by an upward movement of slide 379 as the paper feed actuating bar returns laterally to its normal resting position, as shown by solid lines in Fig. 11. The above described downward and upward motions of slide 379 impart, through paper feed actuating arm 386, pawl handle 408 and feed pawl 411, a rotational paper advance movement to the ratchet wheel 421 to the extent of one ratchet tooth 419, as shown by solid and dotted lines in Fig. 11.

Figs. 4 and 33 illustrate platen stop lugs 363 and platen aligning notches 364, which serve to limit the forward movement of platen 357 to insure even printing of the type-line when the said type-line is short, or is positioned off-center in relation to the platen printing surface 360. It sometimes occurs that a mistake will be discovered in the assembling of a type-line. Since the type bars can only be cleared and returned to their resting position on the top of type channel 75 by a complete cycle of operation, it is desirable that a means be provided to prevent the paper advance action during the said cycle of printing operation and to prevent the improperly assembled type-line from being printed. Manually operable printing and paper advance stop levers 365 are mounted in webs 366, one on either side of printing platen 357 by stop lever friction mounting pins 367. The said printing and paper advance stop levers 365 are normally positioned in disengagement, as shown in solid lines in Fig. 5. Printing and paper advance stop lugs 368 are mounted on platen 357 in alignment with the said printing and paper advance stop levers 365. When it is desirable to prevent the printing of a type-line, the printing and paper advance stop levers 365 are depressed, as shown in dotted lines in Fig. 5, before actuating the line printing and type bar control key 112. In this way the printing action of the platen 367, together with the paper advance mechanism is stopped, and the toggle action of the toggle arms 349 and 350, together with cam follower 345, is taken up within plunger bores 354 and 355 by plunger springs 356 while permitting operation of the clearing of the type bars and the remainder of the printing cycle. In connection with the premature clearing of type bars, a manual disengagement of the carriage assembly locking arm 272 is necessary, a description of which will be hereinafter presented under transfer carriage return means 60.

The said type bar return means 57 is illustrated in Figs. 7, 8 and 9 and is located in Figs. 1, 2 and 3. All of the principal mechanical movements of my type-line printing machine are caused by single revolutions of the prime actuator thereof through common ratio gear and pulley means connected to the automatic clutch means 63. In the type bar return means 57, a type bar return mechanism driving shaft 434 is mounted horizontally between front and back frame portions 67 and 68, and is connected by bevel gear 433 to mating bevel gear 471 on printing drive shaft 336. A bearing 435 on rear portion 68 provides added journaling for the said type bar return mechanism driving shaft 434 on the two ends of which are mounted pulleys 436. The right hand pulley 436 is illustrated in Fig. 7, and is connected by pulley belt 437 to a pulley 438. The pulley 438 is mounted on a pulley shaft 439 on the outside of magazine supporting portion 71 and is supported by hub portion 440, as shown in Fig. 8.

A driving friction wheel 441 is mounted adjacent pulley 438 on shaft 439 and a flat 442 is formed thereon for about seventy-five degrees of its circumference. Frictional driving covers 443, preferably of rubber or like material, cover the outer circumferences of the driving friction wheel 441 and that of a driven friction wheel 444. The driven friction wheel 444 is mounted on a hub 449 by a mounting shaft 448 to be in contactual alignment with the said driving frictional wheel 441. The driven friction wheel 444 is dished at 446 and a spiral spring 447 is mounted therein, one end of which is fixed to the said friction wheel 444, and the other end to the frame portion 71 by a pin 445, as best shown in Fig. 9. An offset bearing bracket 450 is fixedly attached to the inner end of shaft 448 and has a secondary bearing 451 formed vertically, and at right angles, on its offset portion. A return arm 452 is mounted by means of a reduced extension 453 on the upper end thereof within secondary bearing 451, and is held in place by return arm head 454. A roller 458 is mounted on return arm 452 over a cam slot slide 457, which is held in place by an attached cam slot pin 459 riding within an angularly disposed cam slot 456 on return arm 452. The said cam slot 456 covers approximately ninety degrees of the circumference of the return arm 452 and its top is normally aligned with the center line of the lower end 72' of the type return groove 72, as best shown in Fig. 8.

Multiple return arm fingers are fixed near the lower ends of return arms 452, at right angles thereto, and are normally retracted against the front and back frame portions 67 and 68, as shown in Fig. 2. The two sets of return arm fingers 455 are of a sufficient length that, when rotated ninety degrees, will overlap; or in other words, their ends will extend past the center line of the line-printing typewriter, as shown in Fig. 2, to engage all of the suspended type bars. The said return arm fingers 455 are positioned high enough to clear the type-line printing means 59.

All of the parts of the type bar return means 57, hereinabove described and enumerated, are duplicated in oppositely disposed placement on the front frame portion 67, as shown in Fig. 2, with the exception that added connecting pulleys 492, 493, pulley shaft 491, and belts 494 and 495 are required to allow for the keyboard recess 500. At rest, or normal position, as shown in Fig. 8, the flat portion 442 of driving friction wheel is shown out of contact with driven friction wheel 444. As rotary motion is imparted to driving friction wheel 441 through shaft 439, pulleys 436, 438 and belts 437, the contacting frictional covers 443 thereon contact the surface of driven friction wheels 444. The clockwise rotational movement of driven frictional wheel 444 is imparted through offset bearing shaft 448 to return arm 452. The lower end 72' of return arm roller groove 72 is straight and in a horizontal plane, as shown in Fig. 8. Therefore, as return arm 452 rotates in a vertical plane, the roller 458 will be slidably moved downwardly along the said return arm 452. The cam slot slide 457 thereon will, through cam slot pin 459 riding in cam slot 456, cause a horizontal rotational movement of approximately ninety degrees to the said return arms 452, together with return arm fingers 455, revolving the said return arm fingers to the positions shown in dotted lines in Fig. 2. As the rollers 458 enter the arcuate portions of roller grooves 72 in their clockwise rotational movement, the return arm fingers 455 will contact and push before them all of the suspended type bars 84 in an arcuate movement about the type bar return portion 80 of type bar channels 75 until the type bars have been returned to the type bar magazine portion 78, as shown in Fig. 3. At this point, the clockwise rotational movement of return arms 452 will cease because the presentation of the flat 442 on driving friction wheel 441 will end frictional contact therebetween. Also at this point, driving friction wheel 441 will have completed its prescribed one revolution and will come to a stop. Since there is no longer contact between the driven friction wheel 444 and driving friction wheel 441, the now charged spiral spring 447, mounted within and attached to friction wheel 444, will cause a counter-clockwise, or return, rotational movement thereto, carrying return arms 451 back to their normal resting positions, as shown in Fig. 8, with return arm fingers 455 returned to their normal positions against the front and back frame portions 67 and 68, as shown in solid lines in Fig. 2.

Simultaneously with the initiation of the type bar return means 57 and the advancing of the adjustable paper feed means 58, is the initiation of the transfer carriage return means, designated 60, which is illustrated in Figs. 26, 34, 35 and 36 and located in Figs. 2 and 3. The line measuring rack carriage assembly 235 is supported on leg guides within guide ways 498 in leg sliding extensions 251, as shown in Fig. 26. A central elevating extension 253 extends downwardly from line measuring rack carriage assembly 235 to contact frame bracket support 262, and in its lowermost position, to rest upon resilient cushion 264 on downward movement stop 263.

Fig. 34 is a cross-sectional view showing the line measuring rack carriage assembly 235 being held in a line assembling position by a carriage assembly locking arm 272, and dog portion 273 of which is shown in locking engagement with the upper two notches in the elevating extensions 253, designated the carriage assembly position holding notch 270. The lower notch is designated 271 and maintains the carriage in a printing position when engaged by the said dog portion 273. The said locking arm 272 is pivotably mounted by pin 275 between bearing lugs 274, and is held in engagement with one of the notches 270, or 271, by a flat spring 276 in connection therewith. A bearing lug 277, together with a pivoting pin 278, link head 284' and a link pin 285', provide connecting means for a slotted link 279 therebetween. A connecting link 283 is slidably confined by guide element 286 on paper feed roll mounting web 338 and has its upper end, or link head 284, fixedly attached by a link pin 285 to paper feed actuating bar 372, as shown in Fig. 34. As the said paper feed actuating bar 372 moves, first to the left, then to the right in its printing action, as shown by solid and dotted lines in Fig. 34, a notch engaging dog 282 fixed to link head 284 engages the notch 281 within slot 280 and on the return right hand movement thereof serves to disengage locking arm 272 from the notch 271. The carriage assembly 235 is thereby allowed to drop to its lowermost position resting upon carriage assembly stop 264 to provide return clearance for type means 51 over left hand marginal jaw 215 in the type return operation. As connecting link 283 reaches the extent of its right hand return movement, the arcuate movement of locking arm 272 will serve to disengage notch 281 from the said locking dog 282, and allow the said spring urged locking arm 272 to return to contactual relationship with elevating extension 253, as shown in Fig. 34.

An elevating and rack transfer lever 254 is pivotably mounted by transfer lever mounting shoulder screw 255 in elevating extension 253, as shown in Fig. 26. The said elevating and rack transfer lever 254 has an extended rack moving cam surface 260, the upper portion of which is offset to form an elevating cam surface 261. A rack moving pin 257 is fixed in the side of line measuring rack 194 and engages a slot 256 in the upper extended portion of elevating and rack transfer lever 254. A lever stop 259 is fixed in the side of transfer carriage 235 to engage a lever stop notch 258 formed in the elevating and rack transfer lever 254. A transfer and lift cam 294 is mounted on cam mounting shaft 293 in frame bracket support 262, as shown in Fig. 26. On the inner end of cam mounting shaft 293 is mounted a bevel gear 295, which with mating bevel gear 296 on bearing extension 314, provides a rotational movement for the said transfer and lift cam 294. The line measuring rack carriage assembly 235 is shown in the assembly position in solid lines in Fig. 26, and the movement of line measuring rack 194 from the assembly to the printing position; that is, from right to left, will carry the elevating and rack transfer lever 254 to one of the positions shown in dotted lines to the left in Fig. 26. As the carriage assembly 235 is dropped to a line clearing position, as hereinabove described, the elevating and rack transfer lever 254 will appear in the lowermost position, shown in dotted lines in Fig. 26 at the left side of the view, which will bring cam surface 260 into contact with rotating cam 294. The continued rotation of the said cam 294, as shown by dotted lines in Fig. 26, will, through lever 254, cause line measuring rack 194 to be moved to the right until the lever stop notch 258 in transfer lever 254 engages lever stop 259. The said lever stop 259 in stopping lever 254 will change the direction of its movement from horizontally left to right to vertically upward, due to rack elevating cam surface 261 still being engaged by the tip of the rotating cam 294.

The last described action raises the assembly carriage 235 to the assembly position, as shown by solid line in Fig. 26. At the assembling position, the tip of rotating cam 294 will clear cam surface 261 and continue its rotational movement until it has completed its prescribed one revolution.

To sum up the cycle of movement of the line measuring rack 194 and line measuring rack carriage assembly 235, starting with the assembly position, as shown in solid lines in Fig. 26, the carriage assembly 235 is raised to the printing level at which the line measuring rack 194 is released and moved to the left to the printing station. After the printing operation, the carriage assembly 235 drops to the lowermost, or type bar clearing, position, and is then moved to the right and raised one notch to the assembly position by action of the rotating cam 294. It may be pointed out that the operator keeps right on setting up type during the printing and type bar clearing operations as they in no way interfere with the type assembly procedure.

The hereinabove mentioned prime mover means, designated 62, is located in Figs. 1 and 2 and consists preferably of an electric motor 460, together with gear reduction means 461, which with a clutch drive shaft 482 attached to clutch housing 301 to provide motive power for all the principal mechanical actions and movements of my line-printing typewriter. An electrical switch 489 and an electric power cable 490 provide the necessary power connections.

A principal advantage of my line-printing typewriter from the user's standpoint would be its extreme operational simplicity. After rolls of printing paper and tympan stock are mounted on their respective rollers and fed through the paper advance mechanism and carbon ribbon is placed in position on the carbon ribbon spools, the line-printing typewriter is ready for use.

The operator places himself before the typewriter key board with his copy. The type bar locking rod is withdrawn and the prime mover control switch is turned on. Assuming a standard sized font of type, such as six point, is in the magazine core, the typist adjusts the right and left hand marginal jaws to the desired position and line width. A line of copy is typed using the electromatic key board having standard typewriter key arrangement. When one type line has been assembled, the operator depresses the print actuating and type bar clearing key, and proceeds to assemble, or type-set, the second line of copy; during which time the type-line shift, the printing operation, the paper advance, and the carriage return operations are automatically performed without attention from the typist. The operator continues to type, uninterruptedly, until the copy is finished. The typed copy is removed from the copy container either in one continuous length, or cut to desired page sizes for reproduction.

Although I have herein described rather succinctly the nature and use of my invention so that persons skilled in the art will have no difficulty apprising themselves of the teachings thereof and, inasmuch as the disclosure is susceptible of various alterations, modifications, and improvements, I hereby reserve the right to all modifications, alterations, and improvements falling within the scope and spirit of my invention, as well as any modifications that are embraced suggestively in the accompanying drawings, and any that may come within the purview of the foregoing description; my invention to be limited only by the appended claims.

Having thus disclosed and revealed my invention, what I claim as new and desire to secure by Letters Patent is:

1. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, and line printing and type bar clearing control key means mounted on the said framework means adjacent the said keyboard means.

2. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, and type bar impeller means mounted on the said framework means and positioned intermediately of the said type channel magazine means and the said type assembly and transfer carriage means and outside the range of the ambital movements of the said type bar return means.

3. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type face selector means pivotably connected to the said framework means at a point located outside the range of the ambital movements of the said type bar return means, and face selector cam means associated therewith to motivate the same selectively to various ranges of altitude.

4. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside the range of the ambital movements of the said type bar return means, type face selector means pivotably connected to the said framework means at a point located outside the range of the ambital movements of the said type bar return means, and face selector cam means associated therewith to motivate the same selectively to various ranges of altitude.

5. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, and adjustable paper feed means mounted within the said framework means to present a paper surface intermediate the said type line printing means and the said carbon ribbon feed means.

6. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer cariage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside the range of the ambital movements of the said type bar return means, and adjustable paper feed means mounted within the said framework means to present a paper surface intermediate the said type line printing means and the said carbon ribbon feed means.

7. A line printing typewriter comprising, framework means, type channel magazine means mounted on the said framework means, type means mounted in the said type chanel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type face selector means pivotably connected to the said framework means at a point located outside the range of the ambital movements of the said type bar return means, face selector cam means associated therewith to motivate the same selectively to various ranges of altitude, and adjustable paper feed means mounted within the said framework means to present a paper surface intermediate the said type line printing means and the said carbon ribbon feed means.

8. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside the range of the ambital movements of the said type bar return means, type face selector means pivotably connected to the said framework means at a point located outside the range of the ambital movements of the said type bar return means, face selector cam means associated therewith to motivate the same selectively to various ranges of altitude, and adjustable paper feed means mounted within the said framework means to present a paper surface intermediate the said type line printing means and the said carbon ribbon feed means.

9. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, prime mover means, clutch means connected to the said prime mover means, and drive means interconnecting the said clutch means and the said type line printing means.

10. A line printing typewriter comprising, framework means, type channel magazine means mounted on the said framework means, type means mounted in the said type chanel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside the range of the ambital movements of the said type bar return means, prime mover means, clutch means connected to the said prime mover means, and drive means interconnecting the said clutch means and the said type line printing means.

11. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type face selector means pivotably connected to the said framework means at a point located outside the range of the ambital movements of the said type bar return means, face selector cam means associated therewith to motivate the same selectively to various ranges of altitude, prime mover means, clutch means connected to the said prime mover means, and drive means interconnecting the said clutch means and the said type line printing means.

12. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside the range of the ambital movements of the said type bar return means, type face selector means pivotably connected to the said framework means at a point located outside the range of the ambital movements of the said type bar return means, face selector cam means associated therewith to motivate the same selectively to various ranges of altitude, prime mover means, clutch means connected to the said prime mover means, and drive means interconnecting the said clutch means and the said type line printing means.

13. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, adjustable paper feed means mounted within the said framework means to present a paper surface intermediate the said type line printing means and the said carbon ribbon feed means, prime mover means, clutch means connected to the said prime mover means, and drive means interconnecting the said clutch means and the said type line printing means.

14. A line printing typewriter comprising, framework means, type channel magazine means mounted on the said frame work means, type means mounted in the said type channel magazine means and operating in a continuous circuitous path therein, type release means mounted on the same framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside ¦ ¦ range of the ambital movements of the said type bar return means, adjustable paper feed means mounted within the said framework means to present a paper surface intermediate the said type line printing means and the said carbon ribbon feed means, prime mover means, clutch means connected to the said prime mover means, and drive means interconnecting the said clutch means and the said type line printing means.

15. A line printing typewriter comprising, framework means, type channel magazine means mounted on the said frame work means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type face selector means pivotally connected to the said framework means at a point located outside the range of the ambital movements of the said type bar return means, face selector cam means associated therewith to activate the same selectively to various ranges of altitude, adjustable paper feed means mounted within the said framework means to present a paper surface intermediate the said type line printing means and the said carbon ribbon feed means, prime mover means, clutch means connected to the said prime mover means, and drive means interconnecting the said clutch means and the said type line printing means.

16. A line printing typewriter comprising, framework means, type channel magazine means mounted on the said frame work means, type means mounted in the said type channel magazine means and operating in a continuous circuitous path therein, type release means mounted on the same framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside the range of the ambital movements of the said type bar return means, type face selector means pivotably connected to the said framework means at a point located outside the range of the ambital movements of the said type bar return means, face selector cam means associated therewith to motivate the same selectively to various ranges of altitude, adjustable paper feed means mounted within the said framework means to present a paper surface intermediate the said type line printing means and the said carbon ribbon feed means, prime mover means, clutch means connected to the said prime mover means, and drive means interconnecting the said clutch means and the said type line printing means.

17. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, prime mover means, clutch means connected to the said prime mover means, and drive means interconnecting the said type bar return means and the said clutch means.

18. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its orginal position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside the range of the ambital movements of the said type bar return means, prime mover means, clutch means connected to the said prime mover means, and drive means interconnecting the said type bar return means and the said clutch means.

19. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type face selector means pivotably connected to the said framework means at a point located outside the range of the ambital movements of the said type bar return means, face selector cam means associated therewith to motivate the same selectively to various ranges of altitude, prime mover means, clutch means connected to the said prime mover means, and drive means interconnecting the said type bar return means and the said clutch means.

20. A line printing typewriter comprising, framework means, type channel magazine means mounted on the said frame work means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside the range of the ambital movements of the said type bar returns means, type face selector means pivotably connected to the said framework means at a point located outside the range of the ambital movements of the said type bar return means, face selector cam means associated therewith to motivate the same selectively to various ranges of altitude, prime mover means, clutch means connected to the said prime mover means, and drive means interconnecting the said type bar return means and the said clutch means.

21. A line printing typewriter comprising, framework means, type channel magazines means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, adjustable paper feed means mounted within the said framework means to present a paper surface intermediate the said type line printing means and the said carbon ribbon feed means, prime mover means, clutch means connected to the said prime mover means, and drive means interconnecting the said type bar return means and the said clutch means.

22. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework in registry with the said type assembly means and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside the range of the ambital movements of the said type bar return means, adjustable paper feed means mounted within the said framework means to present a paper surface intermediate the said type line printing means and the said carbon ribbon feed means, prime mover means, clutch means connected to the said prime mover means, and drive means interconnecting the said type bar return means and the said clutch means.

23. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type face selector means pivotally connected to the said framework means at a point located outside the range of the ambital movements of the said type bar return means, face selector cam means associated therewith to motivate the same selectively to various ranges of altitude, adjustable paper feed means mounted within the said framework means to present a paper surface intermediate the said type line printing means and the said carbon ribbon feed means, prime mover means, clutch means connected to the said prime mover means, and drive means interconnecting the said type bar return means and the said clutch means.

24. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted with the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside the range of the ambital movements of the said type bar return means, type face selector means pivotably connected to the said framework means at a point located outside the range of the ambital movements of the said type bar return means, face selector cam means associated therewith to motivate the same selectively to various ranges of altitude, adjustable paper feed means mounted within the said framework means to present a paper surface intermediate the said type line printing means and the said carbon ribbon feed means, prime mover means, clutch means connected to the said prime mover means, and drive means interconnecting the said type bar return means and the said clutch means.

25. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, prime mover means, clutch means connected to the said prime mover means, drive means interconnecting the said clutch means and the said type line printing means, and a second drive means interconnecting the said type bar return means and the said clutch means.

26. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and position 1 intermediately of the said type channel magazine means and the said type assembly and transfer carriage means and outside the range of the ambital movements of the said type bar return means, prime mover means, clutch means connected to the said prime mover means, drive means interconnecting the said clutch means and the said type line printing means, and a second drive means interconnecting the said type bar return means and the said clutch means.

27. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type face selector means pivotably connected to the said framework means at a point located outside the range of the ambital movements of the said type bar return means, face selector cam means associated therewith to motivate the same selectively to various ranges of altitude, prime mover means, clutch means connected to the said prime mover means, drive means interconnecting the said clutch means and the said type line printing means, and a second drive means interconnecting the said type bar return means and the said clutch means.

28. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the same framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside the range of the ambital movements of the said type bar return means, type face selector means pivotably connected to the said framework means at a point located outside the range of the ambital movements of the said type bar return means, face selector cam means associated therewith to motivate the same selectively to various ranges of altitude, prime mover means, clutch means connected to the said prime mover means, drive means interconnecting the said clutch means and the said type line printing means, and a second drive means interconnecting the said type bar return means and the said clutch means.

29. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, adjustable paper feed means mounted within the said framework means to present a paper surface intermediate the said type line printing means and the said carbon ribbon feed means, prime mover means, clutch means connected to the said prime mover means, drive means interconnecting the said clutch means and the said type line printing means, and a second drive means interconnecting the said type bar return means and the said clutch means.

30. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside the range of the ambital movements of the said type bar return means, adjustable paper feed means mounted within the said framework means to present a paper surface intermediate the said type line printing means and the said carbon ribbon feed means, prime mover means, clutch means connected to the said prime mover means, drive means interconnecting the said clutch means and the said type line printing means, and a second drive means interconnecting the said type bar return means and the said clutch means.

31. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type face selector means pivotably connected to the said framework means at a point located outside the range of the ambital movements of the said type bar return means, face selector cam means associated therewith to motivate the same selectively to various ranges of altitude, adjustable paper feed means mounted within the said framework means to present a paper surface intermediate the said type line printing means and the said carbon ribbon feed means, prime mover means, clutch means connected to the said prime mover means, drive means interconnecting the said clutch means and the said type line printing means, and a second drive means interconnecting the said type bar return means and the said clutch means.

32. A line printing typewriter comprising, framework means, type channel magazine means mounted on the said framework means, type means mounted in the said type channel magazine means and operating in a continuous circuitous path therein, type release means mounted on the said framework means, keyboard means mounted on the said framework means and electrically connected to the said type release means, type assembly and transfer carriage means mounted within the said framework means and lying within a plane determined by the longitudinal axis of the said type channel magazine means and the longitudinal axis of the said type assembly and transfer carriage means, type bar return means mounted on the said framework means and adapted to operate about a substantial distance of the outer perimetral range of the said type channel magazine means returning through reverse direction to its original position, type line printing means mounted within the said framework means, carbon ribbon feed means mounted within the said framework means in registry with the said type assembly and transfer carriage means and the said type line printing means, transfer carriage return means mounted within the said framework means and connected to the said type assembly and transfer carriage means, line printing and type bar clearing control key means mounted on the said framework means adjacent the said keyboard means, type bar impeller means mounted on the said framework means and positioned intermediately of the said type channel magazine means and the said type assembly and transfer carriage means and outside the range of the ambital movements of the said type bar return means, type face selector means pivotably connected to the said framework means at a point located outside the range of the ambital movements of the said type bar return means, face selector cam means associated therewith to motivate the same selectively to various ranges of altitude, adjustable paper feed means mounted within the said framework means to present a paper surface intermediate the said type line printing means and the said carbon ribbon feed means, prime mover means, clutch means connected to the said prime mover means, drive means interconnecting the said clutch means and the said type line printing means, and a second drive means interconnecting the said type bar return means and the said clutch means.

33. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation.

34. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, and type bar means having a channel engaging portion and a type face holding portion at right angles thereto, the said type face holding portion having angularly bent portions coincident with the longitudinal axis of the said type channel magazine means.

35. In a line printing typewriter, type channel magazine means comprising a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, and type assembly and transfer carriage means located below the said type channel magazine means the longitudinal axis thereof lying parallel to the central type bar assembly and printing base portion of the central type bar channel.

36. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, type bar means having a channel engaging portion and a type face holding portion at right angles thereto, the said type face holding portion having angularly bent portions coincident with the longitudinal axis of the said type channel magazine means, and type assembly and transfer carriage means located below the said type channel magazine means the longitudinal axis thereof lying parallel to the central type bar assembly and printing base portion of the central type bar channel.

37. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, and type bar impeller means located adjacent the apices of the said type bar channels.

38. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, type bar means having a channel engaging portion and a type face holding portion at right angles thereto, the said type face holding portion having angularly bent portions coincident with the longitudinal axis of the said type channel magazine means, and type bar impeller means located adjacent the apices of the said type bar channels.

39. In a line printing typewriter, type channel magazine means comprising a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, type assembly and transfer carriage means located below the said type channel magazine means the longitudinal axis thereof lying parallel to the central type bar assembly and printing base portion of the central type bar channel, and type bar impeller means located adjacent the apices of the said type bar channels.

40. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, type bar means having a channel engaging portion and a type face holding portion at right angles thereto, the said type face holding portion having angularly bent portions coincident with the longitudinal axis of the said type channel magazine means, type assembly and transfer carriage means located below the said type channel magazine means the longitudinal axis thereof lying parallel to the central type bar assembly and printing base portion of the central type bar channel, and type bar impeller means located adjacent the apices of the said type bar channels.

41. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, and type bar return means adapted to operate about a substantial distance of the outer perimetral range of the said type bar channels returning through reverse direction to its normal position, the said type bar return means being composed of right and left sections normally in open parallel relationship in the forward movement of the said type bar return means the sections thereof are initially rotated 90° to bring the free ends thereof in overlapping relationship.

42. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, type bar means having a channel engaging portion and a type face holding portion at right angles thereto, the said type face holding portion having angularly bent portions coincident with the longitudinal axis of the said type channel magazine means, and type bar return means adapted to operate about a substantial distance of the outer perimetral range of the said type bar channels returning through reverse direction to its normal position, the said type bar return means being composed of right and left sections normally in open parallel relationship in the forward movement of the said type bar return means the sections thereof are initially rotated 90° to bring the free ends thereof in overlapping relationship.

43. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, type assembly and transfer carriage means located below the said type channel magazine means the longitudinal axis thereof lying parallel to the central type bar assembly and printing base portion of the central type bar channel, and type bar return means adapted to operate about a substantial distance of the outer perimetral range of the said type bar channels returning through reverse direction to its normal position, the said type bar return means being composed of right and left sections normally in open parallel relationship in the forward movement of the said type bar return means the sections thereof are initially rotated 90° to bring the free ends thereof in overlapping relationship.

44. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, type bar means having a channel engaging portion and a type face holding portion at right angles thereto, the said type face holding portion having angularly bent portions coincident with the longitudinal axis of the said type channel magazine means, type assembly and transfer carriage means located below the said type channel magazine means the longitudinal axis thereof lying parallel to the central type bar assembly and printing base portion of the central type bar channel, and type bar return means adapted to operate about a substantial distance of the outer perimetral range of the said type bar channels returning through reverse direction to its normal position, the said type bar return means being composed of right and left sections normally in open parallel relationship in the forward movement of the said type bar return means the sections thereof are initially rotated 90° to bring the free ends thereof in overlapping relationship.

45. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, type bar impeller means located adjacent the apices of the said type bar channels, and type bar return means adapted to operate about a substantial distance of the outer perimetral range of the said type bar channels returning through reverse direction to its normal position, the said type bar return means being composed of right and left sections normally in open parallel relationship in the forward movement of the said type bar return means the sections thereof are initially rotated 90° to bring the free ends thereof in overlapping relationship.

46. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, type bar means having a channel engaging portion and a type face holding portion at right angles thereto, the said type face holding portion having angularly bent portions coincident with the longitudinal axis of the said type channel magazine means, type bar impeller means located adjacent the apices of the said type bar channels, and type bar return means adapted to operate about a substantial distance of the outer perimetral range of the said type bar channels returning through reverse direction to its normal position, the said type bar return means being composed of right and left sections normally in open parallel relationship in the forward movement of the said type bar return means the sections thereof are initially rotated 90° to bring the free ends thereof in overlapping relationship.

47. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, type assembly and transfer carriage means located below the said type channel magazine means the longitudinal axis thereof lying parallel to the central type bar assembly and printing base portion of the central type bar channel, type bar impeller means located adjacent the apices of the said type bar channels, and type bar return means adapted to operate about a substantial distance of the outer perimetral range of the said type bar channels returning through reverse direction to its normal position, the said type bar return means being composed of right and left sections normally in open parallel relationship in the forward movement of the said type bar return means the sections thereof are initially rotated 90° to bring the free ends thereof in overlapping relationship.

48. In a line printing typewriter, type channel magazine means comprising, a multiplicity of type bar channels of substantially triangular configuration confining therein type bar means to be motivated in a continuous circuitous path from operative to inoperative positions, the said type bar channels having parallel type bar assembly and printing base portions, the remaining lateral portions thereof being disposed outwardly in fan-like formation, type bar means having a channel engaging portion and a type face holding portion at right angles thereto, the said type face holding portion having angularly bent portions coincident with the longitudinal axis of the said type channel magazine means, type assembly and type carriage means located below the said type channel magazine means the longitudinal axis thereof lying parallel to the central type bar assembly and printing base portion of the central type bar channel, type bar impeller means located adjacent the apices of the said type bar channels, and type bar return means adapted to operate about a substantial distance of the outer perimetral range of the said type bar channels returning through reverse direction to its normal position, the said type bar return means being composed of right and left sections normally in open parallel relationship in the forward movement of the said type bar return means the sections thereof are initially rotated 90° to bring the free ends thereof in overlapping relationship.

ROBERT F. WHEELER.

No references cited.